US012662632B2

(12) United States Patent
Mulcahy et al.

(10) Patent No.: US 12,662,632 B2
(45) Date of Patent: Jun. 23, 2026

(54) LIQUID-CRYSTAL MEDIA AND PNLC LIGHT MODULATION ELEMENT

(71) Applicant: Merck Patent GmbH, Darmstadt (DE)

(72) Inventors: Stephen Mulcahy, Southampton (GB); Eduardo Beltran Gracia, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 455 days.

(21) Appl. No.: 17/641,230

(22) PCT Filed: Sep. 8, 2020

(86) PCT No.: PCT/EP2020/075020
§ 371 (c)(1),
(2) Date: Mar. 8, 2022

(87) PCT Pub. No.: WO2021/048092
PCT Pub. Date: Mar. 18, 2021

(65) Prior Publication Data

US 2022/0348827 A1 Nov. 3, 2022

(30) Foreign Application Priority Data

Sep. 9, 2019 (EP) .................................... 19196166

(51) Int. Cl.

| | |
|---|---|
| ***G02F 1/1333*** | (2006.01) |
| ***C09K 19/20*** | (2006.01) |
| ***C09K 19/58*** | (2006.01) |
| *C09K 19/04* | (2006.01) |
| *C09K 19/12* | (2006.01) |

(52) U.S. Cl.
CPC ............ *C09K 19/588* (2013.01); *C09K 19/20* (2013.01); *G02F 1/133365* (2013.01); *C09K 2019/0448* (2013.01); *C09K 2019/0466* (2013.01); *C09K 2019/0481* (2013.01); *C09K 2019/122* (2013.01)

(58) Field of Classification Search
CPC .... C09K 19/20; C09K 19/586; C09K 19/588; C09K 19/38; C09K 19/3804; C09K 2019/0444; C09K 2019/0448; C09K 2019/0466; C09K 2019/0481; G02F 1/1333; G02F 1/133365
See application file for complete search history.

(56) References Cited

U.S. PATENT DOCUMENTS

| | | | | |
|---|---|---|---|---|
| 8,287,756 | B2 * | 10/2012 | Verrall | C09K 19/586 349/1 |
| 11,697,695 | B2 | 7/2023 | Endo et al. | |
| 11,760,931 | B2 | 9/2023 | Junge et al. | |
| 2018/0244999 | A1 * | 8/2018 | Chen | C09K 19/12 |
| 2019/0177618 | A1 | 6/2019 | Song et al. | |
| 2022/0348827 | A1 * | 11/2022 | Mulcahy | C09K 19/588 |

FOREIGN PATENT DOCUMENTS

| | | | |
|---|---|---|---|
| WO | 2016114253 | A1 | 7/2016 |
| WO | 2017/041872 | A1 | 3/2017 |
| WO | 2018036989 | A1 | 3/2018 |
| WO | 2018/215393 | A1 | 11/2018 |
| WO | 2018206538 | A1 | 11/2018 |
| WO | 2019110458 | A1 | 6/2019 |

OTHER PUBLICATIONS

International Search Report dated Nov. 9, 2020 issued in corresponding PCT/EP2020/075020 application (3 pages).

* cited by examiner

*Primary Examiner* — Geraldina Visconti
(74) *Attorney, Agent, or Firm* — Csaba Henter; MILLEN, WHITE, ZELANO & BRANIGAN

(57) ABSTRACT

The present invention relates to a cholesteric liquid crystalline (LC) medium for a Polymer-Network Liquid Crystalline (PNLC) light modulation element, to a method of its production and to the use of such cholesteric LC media in PNLC light modulation elements. Furthermore, the present invention relates to PNLC light modulation elements, as such, to a method of their production, to the use of such light modulation elements in optic or electro optic devices, in particular in LC displays, and to optic or electro optic devices comprising such light modulation elements according to the present invention.

20 Claims, No Drawings

LIQUID-CRYSTAL MEDIA AND PNLC LIGHT MODULATION ELEMENT

TECHNICAL FIELD

The present invention relates to a cholesteric liquid crystalline (LC) medium for a Polymer-Network Liquid Crystalline (PNLC) light modulation element, to a method of its production and to the use of such cholesteric LC media in PNLC light modulation elements. Furthermore, the present invention relates to PNLC light modulation elements, as such, to a method of their production, to the use of such light modulation elements in optic or electro optic devices, in particular in LC displays, and to optic or electro optic devices comprising such light modulation elements according to the present invention.

BACKGROUND OF THE INVENTION

Switchable waveguides are liquid crystal devices which enable transparent displays. When an LC cell is edge-lit, the light can experience total internal reflection within the boundaries of the LC cell.

In the normal, aligned state there is no hindrance to the light path as long as the refractive indices of the LC host are above that of the glass substrates. When a chiral liquid crystal cell is switched, focal conic domains are formed and this large change in apparent refractive index leads to haze and subsequently light outcoupling from the LC cell.

In this case it is required that the helical pitch be of the order of microns so the reflection band is in the infrared spectrum. This eliminates any colour effect in the LC cell and it has been reported for liquid crystal windows applications in WO 2017/041872A1. However, these systems exhibit switching off times ($t_{off}$), which are not applicable for display applications where fast switching is required.

In addition, polymer network systems for dynamic scattering with moderate haze values of 44% have been suggested in WO 2018/215393 A1. In this regard, there is still a great need of developing systems for display applications with high % haze values while keeping the fast switching of these devices.

In view of the above mentioned problems, the invention is based on the object of providing novel suitable materials, in particular cholesteric LC media for use in PNLC light modulation elements where the helical pitch is of the order of microns so the reflection band is in the infrared spectrum, which do not have the disadvantages indicated above or do so to a reduced extent. Other aims of the present invention are immediately evident to the person skilled in the art from the following description.

Surprisingly, the inventors have found out that one or more of the above and below defined objects can be achieved by the present invention according to claim 1.

BRIEF DESCRIPTION

Thus, the invention relates to cholesteric LC medium for a PNLC light modulation element comprising A) one or more polymerisable compounds in an amount of ≥2% to ≤10% by weight, whereby at least one of which is a compound of formula I, $$P^{11}\text{-}Sp^{11}\text{-}Ar\text{-}Sp^{12}\text{-}P^{12} \qquad \text{I}$$

wherein

Ar is a group selected from the following formulae

Ar1

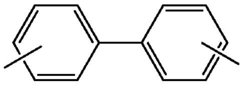

Ar2

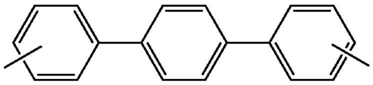

Ar3

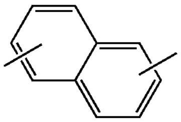

Ar4

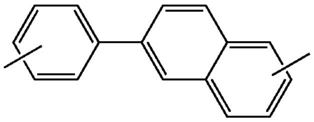

Ar5

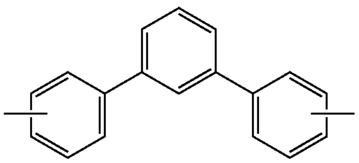

Ar6

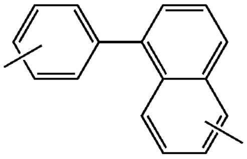

Ar7

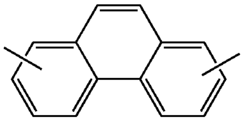

which is optionally substituted by one or more groups L,

L is on each occurrence identically or differently F, Cl, CN, P-Sp-, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that C- and/or S-atoms are not directly connected with each other, and wherein one or more H atoms are each optionally replaced by F or Cl, $P^{11}$ and $P^{12}$ denote each and independently from another a polymerisable group, $Sp^{11}$ and $Sp^{12}$ denote each and independently from another a spacer group that is optionally substituted by one or more groups $P^{11}$ or $P^{12}$, or a single bond, and B) one or more non-polymerisable mesogenic or liquid-crystalline compounds, and C) one or more chiral compounds.

The liquid-crystalline component B) of a cholesteric LC medium according to the present invention is hereinafter also referred to as "LC host mixture", and preferably comprises one or more, preferably at least two mesogenic or LC compounds selected from low-molecular-weight compounds, which are unpolymerisable.

The invention furthermore relates to an cholesteric LC medium or a PNLC light modulation element as described above and below, wherein the compounds of formula I, or the polymerisable compounds of component A), are polymerised.

The invention furthermore relates to a process for preparing an cholesteric LC medium as described above and below, comprising the steps of mixing

- one or more mesogenic or LC compounds, or an LC host mixture or LC component B) as described above and below,
- a polymerisable component A) in an amount of ≥2% to ≤10% comprising, preferably consisting of, one or more polymerisable compounds, at least one of which is a compound of formula I,
- a chiral component C) comprising one or more chiral compounds with optionally further LC compounds and/or additives.

The invention furthermore relates to the use of a cholesteric LC medium as described above and below in a light modulation element based on the PNLC mode.

The invention furthermore relates to a PNLC light modulation element comprising a pair of opposing substrates, an in-plane electrode structure and a cholesteric LC medium located in the interspace of said substrates, characterized in that the light modulation element comprises a polymer network obtainable from the cholesteric LC medium according to the present invention by exposing said cholesteric LC medium to actinic radiation that induces photopolymerisation of the polymerisable compounds in the cholesteric LC medium.

The invention furthermore relates to PNLC light modulation element comprising a polymer network obtainable by polymerisation of one or more compounds of formula I or of a polymerisable component A) as described above and below.

The invention furthermore relates to the use a PNLC light modulation element as described above and below, in optical or electro optical devices. Thus, the invention also relates to optical or electro optical devices comprising the PNLC light modulation elements as described above and below as such.

The invention furthermore relates to a process for the production of the PNLC light modulation element as described above and below in which an cholesteric LC medium as described above and below, is introduced into an LC cell having two substrates and an electrode structure as described above and below, and wherein the polymerisable compounds of the cholesteric LC medium are polymerised.

Especially, by utilizing the cholesteric LC media according to the present invention in PNLC light modulation elements, the above and below mentioned requirements, amongst others, can be fulfilled, preferably at the same time.

In particular, the PNLC light modulation elements in accordance with the present invention exhibit, preferably at the same time,

- high values for the haze,
- favourable fast response times, in particular favourable fast switching off times ($t_{off}$), and
- favourable low voltages required for addressing.

In addition, the PNLC light modulation elements can be produced by compatible, commonly known methods for the mass production.

Terms and Definition

Unless explicitly stated otherwise, the following meanings apply above and below:

The term "liquid crystal", "mesomorphic compound", or "mesogenic compound" (also shortly referred to as "mesogen") means a compound that under suitable conditions of temperature, pressure and concentration can exist as a mesophase (nematic, smectic, etc.) or in particular as a LC phase. Non-amphiphilic mesogenic compounds comprise for example one or more calamitic, banana-shaped or discotic mesogenic groups.

The term "mesogenic group" means a group with the ability to induce liquid-crystalline phase (or mesophase) behaviour. The compounds comprising mesogenic groups do not necessarily have to exhibit a liquid-crystalline mesophase themselves. It is also possible that they show liquid-crystalline mesophases only in mixtures with other compounds, or when the mesogenic compounds or materials, or the mixtures thereof, are polymerised. This includes low-molecular-weight non-reactive liquid-crystalline compounds, reactive or polymerisable liquid-crystalline compounds, and liquid-crystalline polymers. For the sake of simplicity, the term "liquid crystal" is used hereinafter for both mesogenic and LC materials.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

The term "reactive mesogen" or "polymerisable LC compounds" means a polymerisable mesogenic or liquid crystal compound, preferably a monomeric compound. These compounds can be used as pure compounds or as mixtures of reactive mesogens with other compounds functioning as photoinitiators, inhibitors, surfactants, stabilizers, chain transfer agents, non-polymerisable compounds, etc.

Polymerisable compounds with one polymerisable group are also referred to as "monoreactive" compounds, compounds with two polymerisable groups as "direactive" compounds, and compounds with more than two polymerisable groups, i.e. three, four, five or more as "multireactive" compounds. Compounds without a polymerisable group are also referred to as "non-reactive or non-polymerisable" compounds.

The term "non-mesogenic compound or material" means a compound or material that does not contain a mesogenic group as defined above or below.

As used herein, the term "unpolymerisable compound or non-polymerisable mesogenic or liquid-crystalline compounds" will be understood to mean a liquid crystalline compound 1 that does not contain a functional group that is suitable for polymerisation under the conditions usually applied for the polymerisation of the RMs.

"Polymerisable groups" (P) are preferably selected from groups containing a C═C double bond or C≡C triple bond, and groups which are suitable for polymerisation with ring opening, such as, for example, oxetane or epoxide groups.

Preferably, polymerisable groups (P) are selected from the group consisting of $CH_2{=}CW^1{-}COO{-}$, $CH_2{=}CW^1{-}CO{-}$,

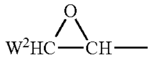, 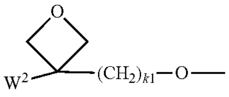,

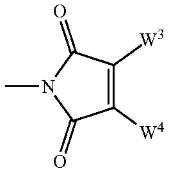, 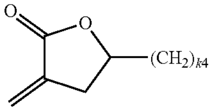, $CH_2{=}CW^2{-}(O)_{k3}{-}$, $CW^1{=}CH{-}CO{-}(O)_{k3}{-}$, $CW^1{=}CH{-}CO{-}NH{-}$, $CH_2{=}CW^1{-}CO{-}NH{-}$, $CH_3{-}CH{=}CH{-}O{-}$, $(CH_2{=}CH)_2CH{-}OCO{-}$, $(CH_2{=}CH{-}CH_2)_2CH{-}OCO{-}$, $(CH_2{=}CH)_2CH{-}O{-}$, $(CH_2{=}CH{-}CH_2)_2N{-}$, $(CH_2{=}CH{-}CH_2)_2N{-}CO{-}$, $CH_2{=}CW^1{-}CO{-}NH{-}$, $CH_2{=}CH{-}(COO)_{k1}\text{-Phe-}(O)_{k2}{-}$, $CH_2{=}CH{-}(CO)_{k1}\text{-Phe-}(O)_{k2}{-}$, Phe-CH=CH—, in which $W^1$ denotes H, F, Cl, CN, $CF_3$, phenyl or alkyl having 1 to 5 C atoms, in particular H, F, Cl or $CH_3$, $W^2$ denotes H or alkyl having 1 to 5 C atoms, in particular H, methyl, ethyl or n-propyl, $W^3$ and $W^4$ each, independently of one another, denote H, Cl or alkyl having 1 to 5 C atoms, Phe denotes 1,4-phenylene, which is optionally substituted by one or more radicals L as being defined above but being different from P-Sp, preferably preferred substituents L are F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl, and $k_1$, $k_2$ and $k_3$ each, independently of one another, denote 0 or 1, $k_3$ preferably denotes 1, and $k_4$ is an integer from 1 to 10.

Particularly preferred polymerizable groups (P) are $CH_2{=}CH{-}COO{-}$, $CH_2{=}C(CH_3){-}COO{-}$, $CH_2{=}CF{-}COO{-}$, $CH_2{=}CH{-}$, $CH_2{=}CH{-}O{-}$, $(CH_2{=}CH)_2CH{-}OCO{-}$, $(CH_2{=}CH)_2CH{-}O{-}$,

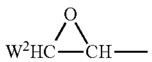 and 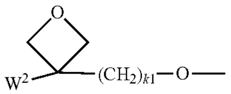, in which $W^2$ denotes H or alkyl having 1 to 5 C atoms, in particular H, methyl, ethyl or n-propyl and $k_1$ denotes 0 or 1.

Further preferred polymerizable groups (P) are, vinyl, vinyloxy, acrylate, methacrylate, fluoroacrylate, chloroacrylate, oxetane and epoxide, most preferably acrylate or methacrylate, in particular acrylate.

Preferably, all multireactive polymerisable compounds and sub-formulae thereof contain instead of one or more radicals P-Sp-, one or more branched radicals containing two or more polymerisable groups P (multireactive polymerisable radicals).

Suitable radicals of this type, and polymerisable compounds containing them, are described, for example, in U.S. Pat. No. 7,060,200 B1 or US 2006/0172090 A1.

Particular preference is given to multireactive polymerisable radicals selected from the following formulae:

$-X\text{-alkyl-}CHP^x{-}CH_2{-}CH_2P^y$ I*a $-X\text{-alkyl-}C(CH_2P^x)(CH_2P^y){-}CH_2P^z$ I*b $-X\text{-alkyl-}CHP^xCHP^y{-}CH_2P^z$ I*c $-X\text{-alkyl-}C(CH_2P^x)(CH_2P^y){-}C_{aa}H_{2aa+1}$ I*d $-X\text{-alkyl-}CHP^x{-}CH_2P^y$ I*e $-X\text{-alkyl-}CHP^xP^y$ I*f $-X\text{-alkyl-}CP^xP^y{-}C_{aa}H_{2aa+1}$ I*g $-X\text{-alkyl-}C(CH_2P^v)(CH_2P^w){-}CH_2OCH_2{-}C(CH_2P^x)(CH_2P^y)CH_2P^z$ I*h $-X\text{-alkyl-}CH((CH_2)_{aa}P^x)((CH_2)_{bb}P^y)$ I*i $-X\text{-alkyl-}CH\ P^xCH\ P^y{-}C_{aa}H_{2aa+1}$ I*k in which alkyl denotes a single bond or straight-chain or branched alkylene having 1 to 12 C atoms, in which one or more non-adjacent $CH_2$ groups may each be replaced, independently of one another, by $-C(R^x){=}C(R^x)-$, $-C{\equiv}C-$, $-N(R^x)-$, —O—, —S—, —CO—, —CO—O—, —O—CO—, —O—CO—O— in such a way that C and/or S atoms are not linked directly to one another, and in which, in addition, one or more H atoms may be replaced by F, Cl or CN, where $R^x$ has one the above-mentioned meaning, $_{aa}$ and $_{bb}$ each, independently of one another, denote 0, 1, 2, 3, 4, 5 or 6, X has one of the meanings indicated for X', and $P^v$ to $P^z$ each, independently of one another, have one of the meanings indicated above for P.

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerisable group(s) in a polymerisable mesogenic compound.

If the spacer group Sp is different from a single bond, it is preferably of the formula Sp'—X', so that the respective radical P-Sp- conforms to the formula P-Sp'—X', wherein Sp' denotes alkylene having 1 to 20, preferably 1 to 12 C atoms, which is optionally mono- or polysubstituted by F, Cl, Br, I or CN and in which, in addition, one or more non-adjacent $CH_2$ groups may each be replaced, independently of one another, by —O—, —S—, —NH—, $-NR^{xx}-$, $-SiR^{xx}R^{yy}-$, —CO—, —COO—, —OCO—, —OCO—O—, —S—CO—, —CO—S—, $-NR^{xx}-CO-O-$, $-O-CO-NR^{xx}-$, $-NR^{xx}-CO-NR^{yy}-$, —CH=CH— or $-C{\equiv}C-$ in such a way that O and/or S atoms are not linked directly to one another, X' denotes —O—, —S—, —CO—, —COO—, —OCO—, —O—COO—, $-CO-NR^{xx}-$, $-NR^{xx}-CO-$, $-NR^{xx}-CO-NR^{yy}-$, $-OCH_2-$, $-CH_2O-$, $-SCH_2-$, $-CH_2S-$, $-CF_{20}-$, $-OCF_2-$, $-CF_2S-$, $-SCF_2-$, $-CF_2CH_2-$, $-CH_2CF_2-$, $-CF_2CF_2-$, —CH=N—, $—N{=}CH—$, $—N{=}N—$, $—CH{=}CR^{xx}—$, $—CY^{xx}{=}CY^{xx}—$, $—C{\equiv}C—$, $—CH{=}CH—COO—$, $—OCO—CH{=}CH—$ or a single bond, preferably —O—, —S— —CO—, —COO—, —OCO—, —O—COO—, $—CO—NR^{xx}—$, $—NR^{xx}—CO—$, $—NR^{xx}—CO—NR^{yy}—$ or a single bond.

$R^{xx}$ and $R^{yy}$ each, independently of one another, denote H or alkyl having 1 to 12 C atoms, and $Y^{xx}$ and $Y^{yy}$ each, independently of one another, denote H, F, Cl or CN.

Typical spacer groups Sp' are, for example, $—(CH_2)_{p1}—$, $—(CH_2CH_2O)_{q1}—CH_2CH_2—$, $—CH_2CH_2—S—CH_2CH_2—$, $—CH_2CH_2—NH—CH_2CH_2—$ or $—(SiR^{xx}R^{yy}—O)_{p1}—$, in which p1 is an integer from 1 to 12, q1 is an integer from 1 to 3, and $R^{xx}$ and $R^{yy}$ have independently from another one the above-mentioned meanings.

Particularly preferred groups —X'-Sp'- are $—(CH_2)_{p1}—$, $—O—(CH_2)_{p1}—$, $—OCO—(CH_2)_{p1}—$, $—OCOO—(CH_2)_{p1}—$, in which p1 is an integer from 1 to 12.

Particularly preferred groups Sp' are, for example, methylene, ethylene or a straight alkyl chain, such as, for example, propylene, butylene, pentylene, hexylene, heptylene, octylene, nonylene, decylene, undecylene, dodecylene, octadecylene, or ethyleneoxyethylene, methyleneoxybutylene, ethylenethioethylene, ethylene-N-methyliminoethylene, 1-methylalkylene, ethenylene, propenylene and butenylene.

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post polymerisation purification processes, are typically mixed or co-mingled with the polymer such that they generally remain with the polymer when it is transferred between vessels or between solvents or dispersion media.

The term "(meth)acrylic polymer" as used in the present invention includes a polymer obtained from (meth)acrylic monomers, a polymer obtainable from (meth)acrylic monomers, and a corresponding copolymer obtainable from mixtures of methacrylic monomers and acrylic monomers.

A "polymer network" is a network in which all polymer chains are interconnected to form a single macroscopic entity by many crosslinks, preferably which extends through the whole cell if utilized in an PNLC device.

The polymer network can occur in the following types:

1. A graft polymer molecule is a branched polymer molecule in which one or more the side chains are different, structurally or configurationally, from the main chain.
2. A star polymer molecule is a branched polymer molecule in which a single branch point gives rise to multiple linear chains or arms. If the arms are identical, the star polymer molecule is said to be regular. If adjacent arms are composed of different repeating subunits, the star polymer molecule is said to be variegated.
3. A comb polymer molecule consists of a main chain with two or more three-way branch points and linear side chains. If the arms are identical, the comb polymer molecule is said to be regular.
4. A brush polymer molecule consists of a main chain with linear, unbranched side chains and where one or more of the branch points has four-way functionality or larger.

The term "polymerisation" means the chemical process to form a polymer by bonding together multiple polymerisable groups or polymer precursors (polymerisable compounds) containing such polymerisable groups.

The definitions as given in C. Tschierske, G. Pelzl and S. Diele, Angew. Chem. 2004, 116, 6340-6368 shall apply additionally to the before given definitions and in particular to non-defined terms related to liquid crystal materials in the instant application.

The birefringence Δn herein is defined by the following equation $$\Delta n = n_e - n_o$$

wherein $n_e$ is the extraordinary refractive index and $n_o$ is the ordinary refractive index and the effective average refractive index $n_{av.}$ is given by the following equation $$n_{av.} = [(2n_o^2 + n_e^2)/3]^{1/2}.$$

The extraordinary refractive index $n_e$ and the ordinary refractive index $n_o$ can be measured e.g. using a modified Abbe refractometer in accordance to "Merck Liquid Crystals, Physical Properties of Liquid Crystals", Status November 1997, Merck KGaA, Germany.

Visible (VIS) light is electromagnetic radiation that has wavelength in a range from about 400 nm to about 800 nm. Unless stated otherwise, ultraviolet (UV) light is electromagnetic radiation with a wavelength in a range from about 200 nm to about 400 nm. Unless stated other wise infrared (IR) light is electromagnetic radiation that has wavelength in a range from about 800 nm to about 1 mm.

The term "transparent" in the context of this application is taken to mean that the transmission of VIS light through the PNLC light modulation element is at least 65% of the incident light, more preferably at least 80%, even more preferably at least 90%.

The radiation dose ($E_e$) is defined as the power of electromagnetic radiation (dθ) per unit area (dA) incident on a surface:

$$E_e = d\theta/dA.$$

The radiation intensity ($H_e$), is defined as the radiation dose ($E_e$) per time (t):

$$H_e = E_e \cdot t.$$

The term "clearing point" means the temperature at which the transition between the mesophase with the highest temperature range and the isotropic phase occurs.

The term "chiral" in general is used to describe an object that is non-superimposable on its mirror image.

"Achiral" (non-chiral) objects are objects that are identical to their mirror image.

The terms "chiral nematic" and "cholesteric" are used synonymously in this application, unless explicitly stated otherwise.

Chiral nematic textures or cholesteric liquid crystals (CLC) exhibit selective reflection of circular-polarised light, with the direction of rotation of the light vector corresponding to the direction of rotation of the cholesteric helix.

The reflection wavelength λ is given by the pitch p of the cholesteric helix and the mean birefringence n of the cholesteric liquid crystal in accordance with the following equation:

$$\lambda = n \cdot p$$

A CLC medium can be prepared, for example, by doping a nematic LC medium with a chiral dopant having a high twisting power. The pitch p of the induced cholesteric helix is then given by the concentration c and the helical twisting power HTP of the chiral dopant in accordance with the following equation:

$$p = (\mathrm{HTP}\ c)^{-1}$$

It is also possible to use two or more dopants, for example in order to compensate for the temperature dependence of the HTP of the individual dopants and thus to achieve low temperature dependence of the helix pitch and the reflection wavelength of the CLC medium. For the total HTP ($HTP_{total}$) holds then approximately the following equation:

$$\mathrm{HTP}_{total} = \Sigma_i c_i \mathrm{HTP}_i$$

wherein $c_i$ is the concentration of each individual dopant and $HTP_i$ is the helical twisting power of each individual dopant.

Throughout the application and unless explicitly stated otherwise, all concentrations are quoted in percent by weight and relate to the respective mixture as a whole, all temperatures are quoted in degrees Celsius and all temperature differences are quoted in differential degrees.

In the present application the term “dielectrically positive” is used for compounds or components with $\Delta\varepsilon > 3.0$, “dielectrically neutral” with $-1.5 \leq \Delta\varepsilon \leq 3.0$ and “dielectrically negative” with $\Delta\varepsilon < -1.5$.

$\Delta\varepsilon$ is determined at a frequency of 1 kHz and at 20° C. The dielectric anisotropy of the respective compound is determined from the results of a solution of 10% of the respective individual compound in a nematic host mixture. In case the solubility of the respective compound in the host medium is less than 10% its concentration is reduced by a factor of 2 until the resultant medium is stable enough at least to allow the determination of its properties. In a preferred embodiment, the concentration is kept at least at 5%, however, in order to keep the significance of the results a high as possible. The capacitance of the test mixtures are determined both in a cell with homeotropic and with homogeneous alignment. The cell gap of both types of cells is approximately 20 μm. The voltage applied is a rectangular wave with a frequency of 1 kHz and a root mean square value typically of 0.5 V to 1.0 V; however, it is always selected to be below the capacitive threshold of the respective test mixture.

$\Delta\varepsilon$ is defined as $(\varepsilon\| - \varepsilon_\perp)$, whereas $\varepsilon_{av.}$ is $(\varepsilon\| + 2\ \varepsilon_\perp)/3$. The dielectric permittivity of the compounds is determined from the change of the respective values of a host medium upon addition of the compounds of interest. The values are extrapolated to a concentration of the compounds of interest of 100%. A typical host medium is ZLI-4792 or BL-087 both commercially available from Merck, Darmstadt.

Unless the context clearly indicates otherwise, as used herein plural forms of the terms herein are to be construed as including the singular form and vice versa.

For the present invention,

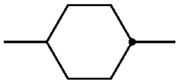,
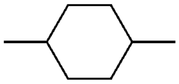,
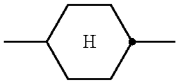
and
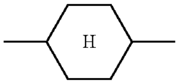, denote 1,4-cyclohexylene, preferably

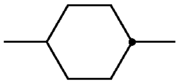
and
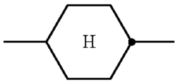

denote trans-1,4-cylohexylene.

For the present invention,

and
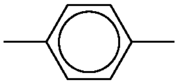

denote 1,4-phenylene.

For the present invention the groups —COO— —C(═O)O— or —$CO_2$— denote an ester group of formula

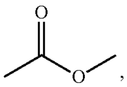, and the groups —OCO—, —OC(═O)—, —$O_2$C— or —OOC— denote an ester group of formula

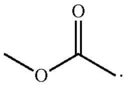.

In a group

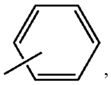, the single bond shown between the two ring atoms can be attached to any free position of the benzene ring.

Above and below, “carbyl group” denotes a mono- or polyvalent organic group containing at least one carbon atom which either contains no further atoms (such as, for example, C≡C) or optionally contains one or more further atoms, such as, for example, N, O, S, P, Si, Se, As, Te or Ge (for example carbonyl, etc.). “Hydrocarbyl group” denotes a carbyl group, which additionally contains one or more H atoms and optionally one or more heteroatoms, such as, for example, N, O, S, P, Si, Se, As, Te or Ge.

A carbyl or hydrocarbyl group can be a saturated or unsaturated group. Unsaturated groups are, for example, aryl, alkenyl, or alkinyl groups. A carbyl or hydrocarbyl group having more than 3 C atoms can be straight chain, branched and/or cyclic and may contain spiro links or condensed rings.

Throughout the application, unless stated explicitly otherwise, the term "aryl and heteroaryl groups" encompass groups, which can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings.

Heteroaryl groups contain one or more heteroatoms, preferably selected from O, N, S and Se. Particular preference is given to mono-, bi- or tricyclic aryl groups having 6 to 25 C atoms and mono-, bi- or tricyclic heteroaryl groups having 2 to 25 C atoms, which optionally contain fused rings, and which are optionally substituted. Preference is furthermore given to 5, 6 or 7-membered aryl and heteroaryl groups, in which, in addition, one or more CH groups may be replaced by N, S or O in such a way that O atoms and/or S atoms are not linked directly to one another. Preferred aryl groups are, for example, phenyl, biphenyl, terphenyl, [1,1':3',1" ]terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, more preferably 1,4-phenylene, 4,4'-biphenylene, 1,4-tephenylene.

Preferred heteroaryl groups are, for example, 5 membered rings, such as pyrrole, pyrazole, imidazole, 1,2,3-triazole, 1,2,4-triazole, tetrazole, furan, thiophene, selenophene, oxazole, isoxazole, 1,2 thiazole, 1,3-thiazole, 1,2,3-oxadiazole, 1,2,4 oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6 membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, iso-indole, indolizine, indazole, benzimidazole, benzotriazole, purine, naphth-imidazole, phenanthrimidazole, pyridimidazole, pyrazinimidazole, quinoxalinimidazole, benzoxazole, naphthoxazole, anthroxazole, phen-anthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]-thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

In the context of this application, the term "(non-aromatic) alicyclic and heterocyclic groups" encompass both saturated rings, i.e. those that contain exclusively single bonds, and partially unsaturated rings, i.e. those that may also contain multiple bonds. Heterocyclic rings contain one or more heteroatoms, preferably selected from Si, O, N, S and Se. The (non-aromatic) alicyclic and heterocyclic groups can be monocyclic, i.e. contain only one ring (such as, for example, cyclohexane), or polycyclic, i.e. contain a plurality of rings (such as, for example, decahydro-naphthalene or bicyclooctane). Particular preference is given to saturated groups. Preference is furthermore given to mono-, bi- or tricyclic groups having 3 to 25 C atoms, which optionally contain fused rings and that are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—. Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methanoindane-2,5-diyl, more preferably 1,4-cyclohexylene 4,4'-bicyclohexylene, 3,17-hexadecahydro-cyclopenta[a]phenanthrene, optionally being substituted by one or more identical or different groups L. Especially preferred aryl-, heteroaryl-, alicyclic- and heterocyclic groups are 1,4-phenylene, 4,4'-biphenylene, 1,4-terphenylene, 1,4-cyclohexylene, 4,4'-bicyclohexylene, and 3,17-hexadecahydro-cyclopenta[a]-phenanthrene, optionally being substituted by one or more identical or different groups L.

Preferred substituents (L) of the above-mentioned aryl-, heteroaryl-, alicyclic- and heterocyclic groups are, for example, solubility-promoting groups, such as alkyl or alkoxy and electron-withdrawing groups, such as fluorine, nitro or nitrile.

Preferred substituents, also referred to as "L" below, are, for example, F, Cl, Br, I, —OH, —CN, $—NO_2$, —NCO, —NCS, —OCN, —SCN, $—C(=O)N(R^x)_2$, $—C(=O)Y^x$, $—C(=O)R^x$, $—C(=O)OR^x$, $—N(R^x)_2$, in which $R^x$ has the above-mentioned meaning, and above $Y^x$ denotes halogen, optionally substituted silyl, optionally substituted aryl or heteroaryl having 4 to 40, preferably 4 to 20 ring atoms, and straight-chain or branched alkyl, alkenyl, alkinyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means silyl or aryl substituted by halogen, —CN, $R^y$, $—OR^y$, $—CO—R^y$, $—CO—O—R^y$, $—O—CO—R^y$ or $—O—CO—O—R^y$, in which $R^y$ denotes H, a straight-chain, branched or cyclic alkyl chain having 1 to 12 C atoms.

In the formulae shown above and below, a substituted phenylene ring

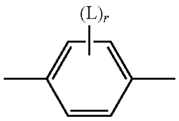

is preferably

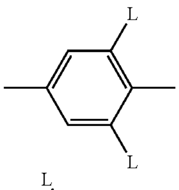
,
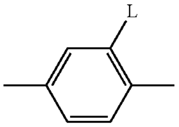
,
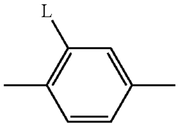
,
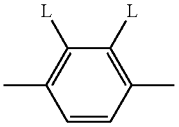
,

-continued

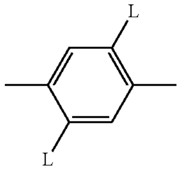

or

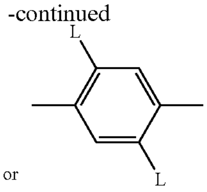

, in which L has, on each occurrence identically or differently, one of the meanings given above and below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, most preferably F, Cl, $CH_3$, $OCH_3$, $COCH_3$ or $OCF_3$.

"Halogen" denotes F, Cl, Br or I, preferably F or Cl, more preferably F.

Above and below, the terms "alkyl", "aryl", "heteroaryl", etc., also encompass polyvalent groups, for example alkylene, arylene, heteroarylene, etc.

The term "aryl" denotes an aromatic carbon group or a group derived there from.

The term "heteroaryl" denotes "aryl" in accordance with the above definition containing one or more heteroatoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclo-pentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoro-methyl, perfluoro-n-butyl, 2,2,2-trifluoroethyl, perfluorooctyl, perfluoro-hexyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl.

Preferred alkynyl groups are, for example, ethynyl, propynyl, butynyl, pentynyl, hexynyl, octynyl.

Preferred amino groups are, for example, dimethylamino, methylamino, methylphenylamino, phenylamino.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

Throughout the description and claims of this specification, the words "obtainable" and "obtained" and variations of the words, mean "including but not limited to", and are not intended to (and do not) exclude other components. On the other hand, the word "obtainable" also encompasses the term "obtained" but is not limited to it.

The term "alignment" or "orientation" relates to alignment (orientation ordering) of anisotropic units of material such as small molecules or fragments of big molecules in a common direction named "alignment direction". In an aligned layer of liquid-crystalline material, the liquid-crystalline director coincides with the alignment direction so that the alignment direction corresponds to the direction of the anisotropy axis of the material.

The term "planar orientation/alignment", for example in a layer of an liquid-crystalline material, means that the long molecular axes (in case of calamitic compounds) or the short molecular axes (in case of discotic compounds) of a proportion of the liquid-crystalline molecules are oriented substantially parallel (about 180°) to the plane of the layer.

The term "homeotropic orientation/alignment", for example in a layer of a liquid-crystalline material, means that the long molecular axes (in case of calamitic compounds) or the short molecular axes (in case of discotic compounds) of a proportion of the liquid-crystalline molecules are oriented at an angle θ ("tilt angle") between about 80° to 90° relative to the plane of the layer.

DETAILED DESCRIPTION

Preferably in the compounds of formula I and its subformulae as described above and below all polymerisable groups P that are present in the compound have the same meaning, and more preferably denote acrylate or methacrylate, most preferably methacrylate.

Further preferred are compounds of formula I and its subformulae wherein the group Ar is selected from formulae Ar5, Ar 6 and Ar7, and the groups P present in the compound are identical or different.

In the compounds of formula I and its subformulae as described above and below, Ar is preferably selected from formulae Ar1, Ar2 and Ar5.

Preferred compounds of formula I are selected from the following subformulae

I1

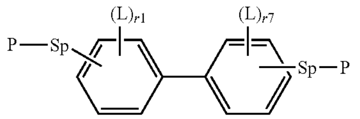

I2

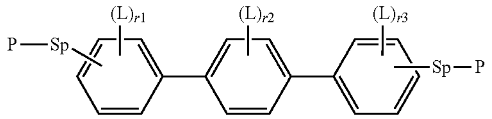

I3

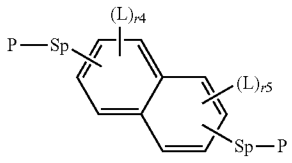

I4

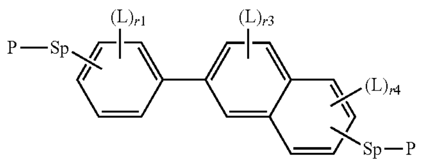

I5

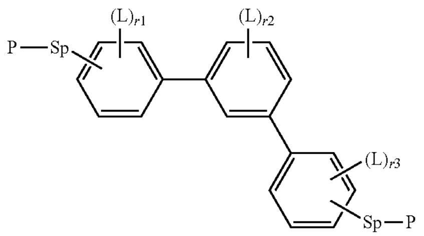

-continued

I6

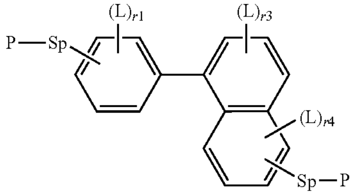

I7

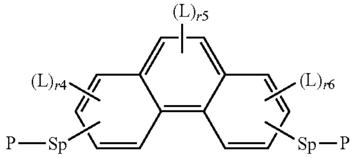

wherein P, Sp, and L have one of the meanings given in formula I, r1, r3, r7 are independently of each other 0, 1, 2 or 3, r2 is 0, 1, 2, 3 or 4, r4, r5, r6 are independently of each other 0, 1 or 2.

Very preferred are compounds of formula I1, I2 and I5.

Further preferred compounds of formula I are selected from the following subformulae

I1-1

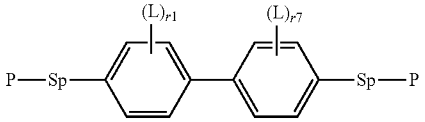

I2-1

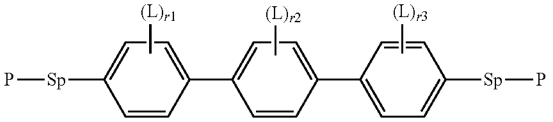

I3-1

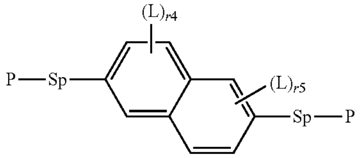

I4-1

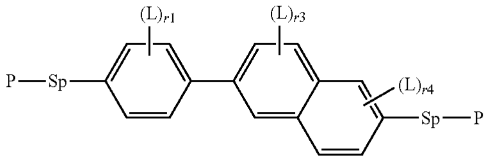

I5-1

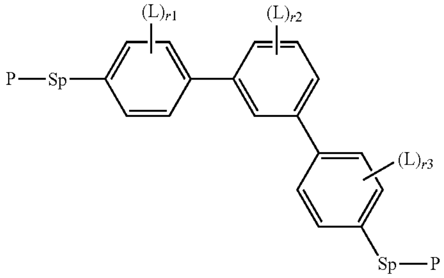

-continued

I6-1

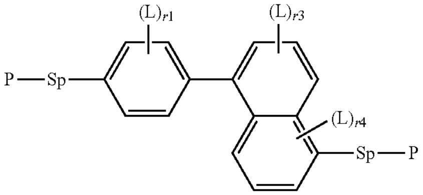

I6-3

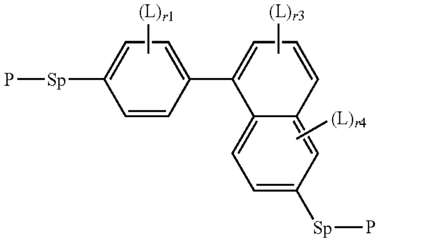

17-1

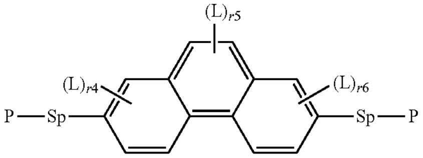

wherein P, Sp, L, r1-r7 have the meanings given in formula I or one of the preferred meanings as given above and below.

Very preferred compounds of formula I are selected from the following subformulae:

I1-1-1

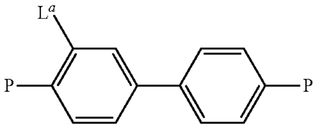

I1-2-2

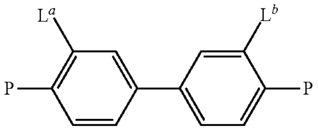

I1-1-3

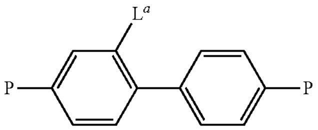

I1-1-4

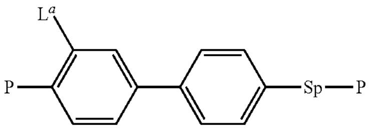

I1-1-5

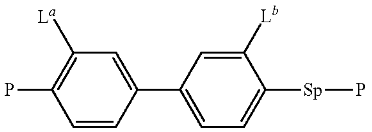

-continued
I1-1-6
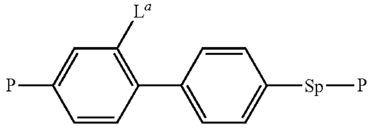
I1-1-7
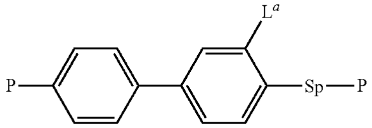
I1-1-8
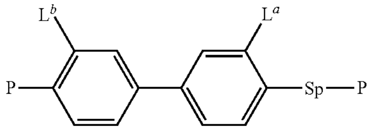
I1-1-9
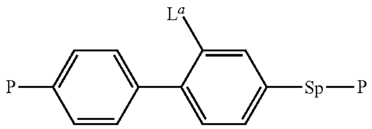
I2-1-1
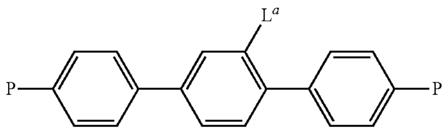
I2-1-2
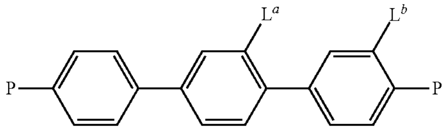
I2-1-3
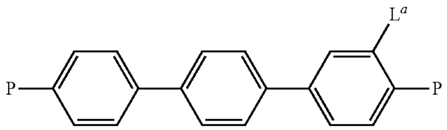
I2-1-4
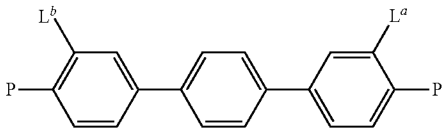
I2-1-5
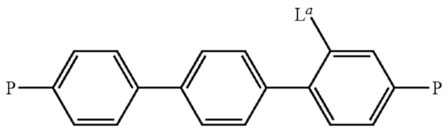
I2-1-6
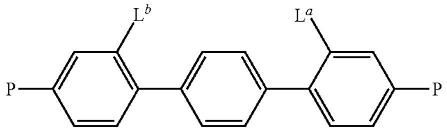
I2-1-7
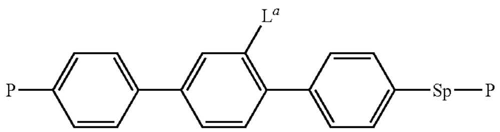
-continued
I2-1-8
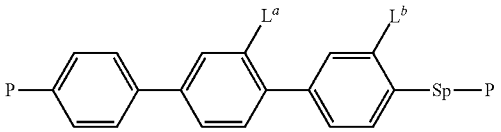
I2-1-9
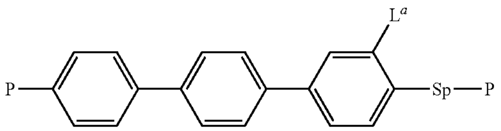
I2-1-10
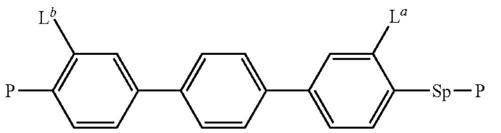
I2-1-11
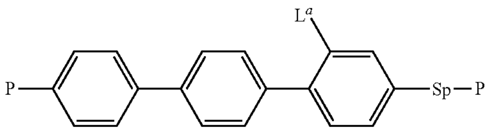
I2-1-12
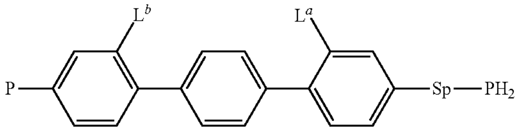
I2-1-13
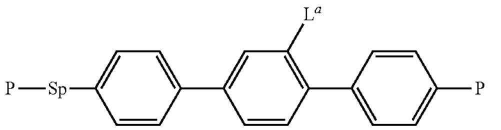
I2-1-14
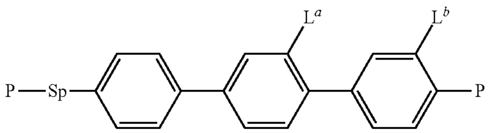
I2-1-15
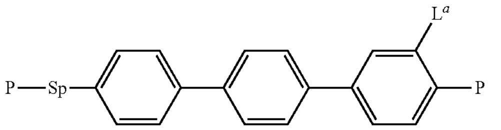
I2-1-16
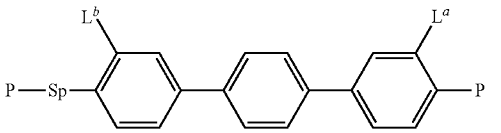
I2-1-17
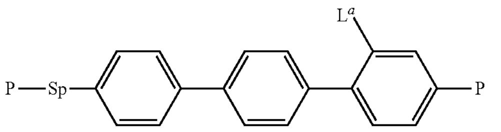

-continued

I2-1-18

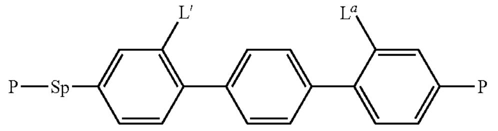

wherein P, Sp, have the meanings given above or below, and La and $L^b$ have each and independently from another one of the meanings given for L above or below.

Very preferred compounds of subformulae I1-1-1 to I2-1-18 are those wherein all groups P are identical and denote either an acrylate or methacrylate group, furthermore those wherein Sp is, $-(CH_2)_{p1}-$, $-(CH_2)_{p1}-O-$, $-(CH_2)_{p1}-O-CO-$ or $-(CH_2)_{p1}-CO-O-$, in which p1 is an integer from 1 to 12, preferably 1 to 6, and the O— or CO-group is connected to the benzene ring, furthermore those wherein $L^a$ and $L^b$ denotes F, $CH_3$, $CH_2CH_3$, $OCH_3$, $OC_2H_5$, $O(CH_2)_2CH_3$, $OC(CH_3)_3$ or $OCF_3$.

Further preferred compounds of formula I and its subformulae are selected from the following preferred embodiments, including any combination thereof:

All groups P in the compound have the same meaning,

Ar is selected from formulae Ar1, Ar2, Ar3 and Ar4, and all groups P present in the compound have the same meaning, Ar is selected from formulae Ar1, Ar2, Ar3, Ar4 and Ar5, and all groups P present in the compound have the same meaning, Ar is selected from formulae Ar1, Ar2, Ar3, Ar4 and Ar6, and all groups P present in the compound have the same meaning, Ar is selected from formulae Ar1, Ar2, Ar3, Ar4 and Ar7, and all groups P present in the compound have the same meaning, Ar is selected from formulae Ar1, Ar2, Ar3, Ar4, A5 and Ar7, and all groups P present in the compound have the same meaning, Ar is selected from formulae Ar1, Ar2, Ar3, Ar4, A6 and Ar7, and all groups P present in the compound have the same meaning, Ar is selected of formula Ar5, and the groups P present in the compound can have the same or different meanings, Ar is selected of formula Ar6, and the groups P present in the compound can have the same or different meanings, Ar is selected of formula Ar7, and the groups P present in the compound can have the same or different meanings, the compounds contain exactly two polymerisable groups (represented by the groups P), P is selected from the group consisting of acrylate, methacrylate and oxetane, Sp, when being different from a single bond, is $-(CH_2)_{p2}-$, $-(CH_2)_{p2}-O-$, $-(CH_2)_{p2}-CO-O-$, $-(CH_2)_{p2}-O-CO-$, wherein p2 is 2, 3, 4, 5 or 6, and the O-atom or the CO-group, respectively, is connected to the benzene ring, $L^b$, when being different from $L^a$, denotes F, Cl or CN, $L^a$ is F, $CH_3$, $CH_2CH_3$, $OCH_3$, $OC_2H_5$, $O(CH_2)_2CH_3$, $OC(CH_3)_3$ or $OCF_3$.

r1, r2 and r3 denote 0 or 1, r1, r2, r3, r4, r5 and r6 denote 0 or 1, one of r1 and r7 is 0 and the other is 1, r1 is 1, and r2 and r3 are 0, r3 is 1 and r1 and r2 are 0, one of r4 and r5 is 0 and the other is 1, r4 and r6 are 0 and r5 is 1, r1 and r4 are 0 and r3 is 1, r1 and r3 are 0 and r4 is 1, r3 and r4 are 0 and r1 is 1.

Further preferred compounds of formula I and its subformulae are selected from compounds of formula I1-1-1, I1-1-3, I1-2-2 and I2-1-1 to I2-1-6 wherein P is selected from the group consisting of acrylate, methacrylate and oxetane, $L^a$ and $L^b$ is each and independently from another F, $CH_3$, $CH_2CH_3$, $OCH_3$, $OC_2H_5$, $O(CH_2)_2CH_3$, $OC(CH_3)_3$ or $OCF_3$.

The compounds and intermediates of the formula I and sub-formulae thereof can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

For example, acrylic or methacrylic esters can be prepared by esterification of the corresponding alcohols with acid derivatives like, for example, (meth)acryloyl chloride or (meth)acrylic anhydride in the presence of a base like pyridine or triethyl amine, and 4-(N,N-dimethylamino)pyridine (DMAP). Alternatively the esters can be prepared by esterification of the alcohols with (meth)acrylic acid in the presence of a dehydrating reagent, for example according to Steglich with dicyclohexylcarbodiimide (DCC), N-(3-dimethylaminopropyl)-N' ethylcarbodiimide (EDC) or N-(3-dimethylaminopropyl)-N' ethylcarbodiimide hydrochloride and DMAP.

Particular preference is given to cholesteric LC media in which the polymerisable component A) comprises one, two or three polymerisable compounds of formula I.

Preference is furthermore given to cholesteric LC media in which the polymerisable component A) comprises exclusively polymerisable compounds of formula I.

Optionally one or more polymerisation initiators can be added to the cholesteric LC medium. Suitable conditions for the polymerisation and suitable types and amounts of initiators are known to the person skilled in the art and are described in the literature.

Suitable for free-radical polymerisation are, for example, the commercially available photoinitiators Irgacure651®, Irgacure184®, Irgacure907®, Irgacure369® or Darocure1173® (Ciba AG). If a polymerisation initiator is employed, its proportion is preferably 0.001 to 5% by weight, particularly preferably 0.001 to 1% by weight.

The polymerisable compounds according to the invention are also suitable for polymerisation without an initiator, which is accompanied by considerable advantages, such, for example, lower material costs and in particular less contamination of the cholesteric LC medium by possible residual amounts of the initiator or degradation products thereof. The polymerisation can thus also be carried out without the addition of an initiator. In a preferred embodiment, the cholesteric LC medium does not contain a polymerisation initiator.

The cholesteric LC medium may also comprise one or more stabilisers in order to prevent undesired spontaneous polymerisation of the RMs, for example during storage or transport. Suitable types and amounts of stabilisers are known to the person skilled in the art and are described in the literature.

Particularly suitable are, for example, the commercially available stabilisers from the Irganox® series (Ciba AG), such as, for example, Irganox® 1076. If stabilisers are employed, their proportion, based on the total amount of RMs or the polymerisable component (component A), is preferably 10-500,000 ppm, particularly preferably 50-50,000 ppm.

Preferably, the cholesteric LC medium according to the present invention does essentially consist of a polymerisable component A), or one or more polymerisable compounds of formula I, a LC component B), or LC host mixture, and a chiral component C) comprising one or more chiral compounds as described above and below.

However, the cholesteric LC medium may additionally comprise one or more further components or additives, preferably selected from the list including but not limited to inhibitors, further stabilizers, wetting agents, lubricating agents, dispersing agents, hydrophobing agents, adhesive agents, flow improvers, defoaming agents, deaerators, diluents, reactive diluents, auxiliaries, colourants, dyes, pigments and nanoparticles.

In another preferred embodiment the polymerisable component A) comprises, in addition to the compounds of formula I, one or more further polymerisable compounds ("co-monomers"), preferably selected from RMs.

Suitable and preferred mesogenic co-monomers are selected from the following formulae:

M1

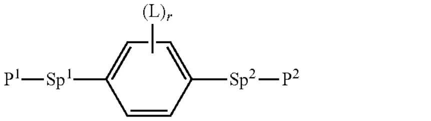

M2

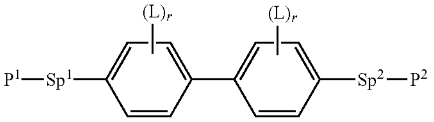

M3

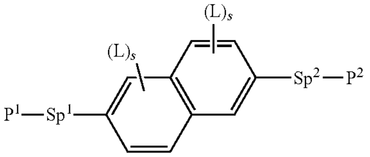

M4

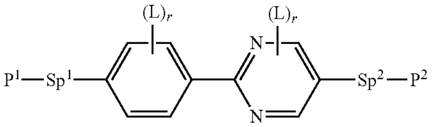

M5

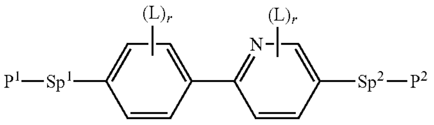

M6

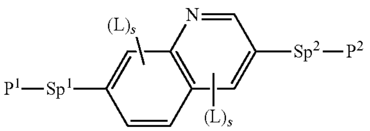

M7

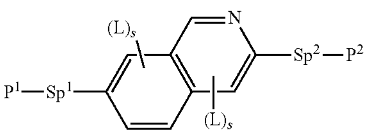

-continued

M8

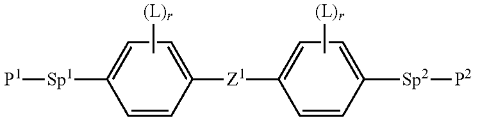

M9

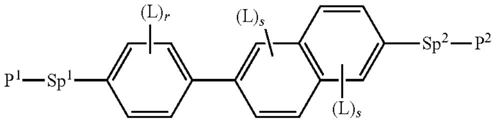

M10

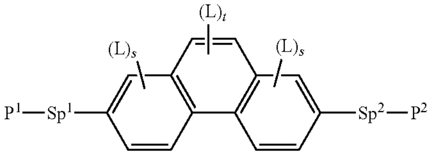

M11

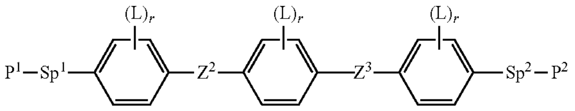

M12

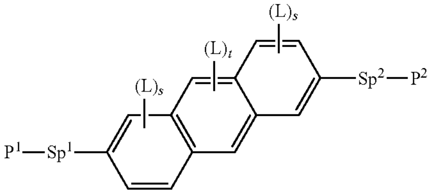

M13

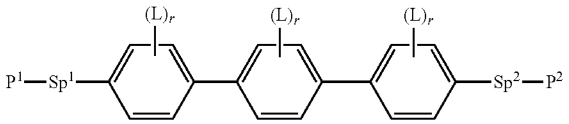

M14

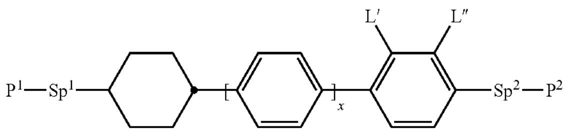

M15

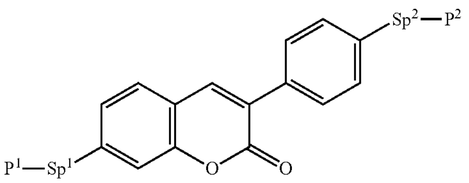

M16

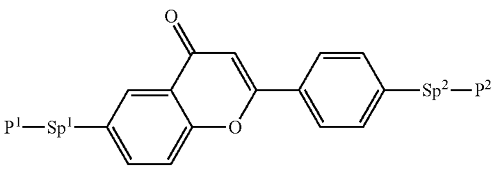

-continued
M17
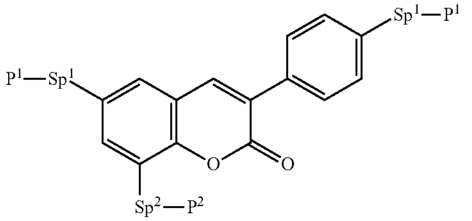
M18
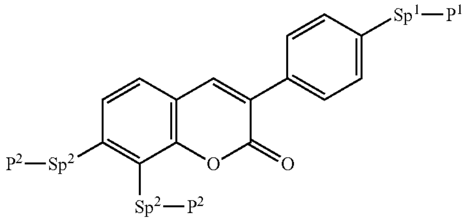
M19
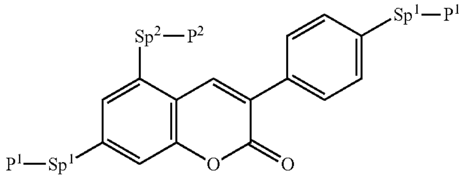
M20
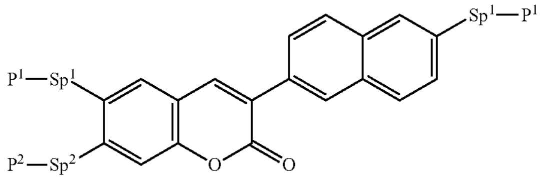
M21
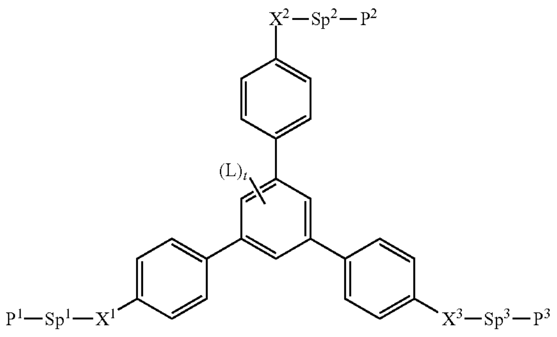
M22
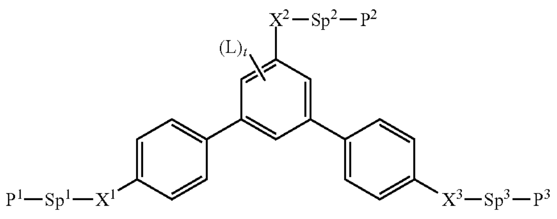
-continued
M23
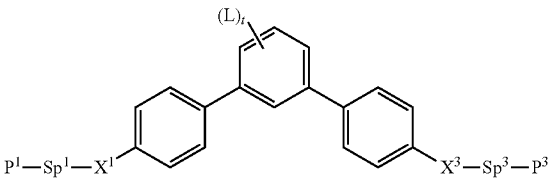
M24
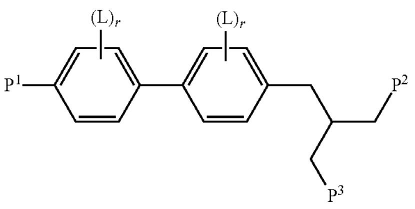
M25
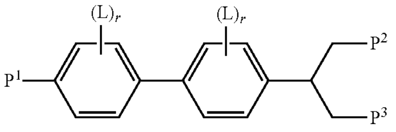
M26
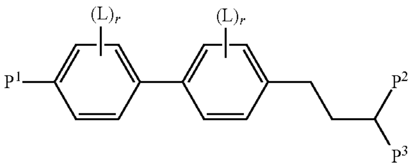
M27
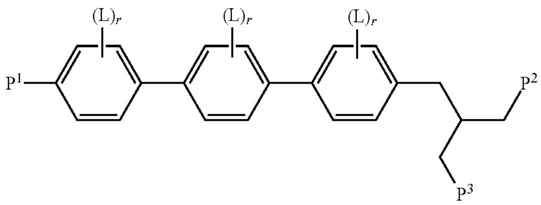
M28
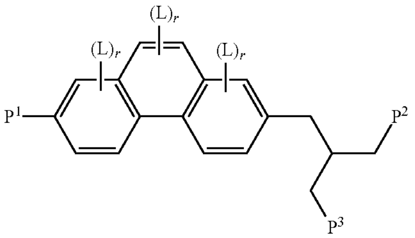
M29
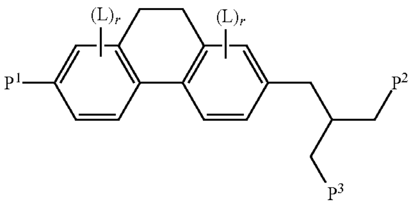
M30
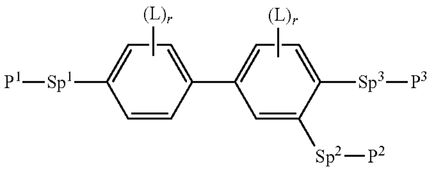

-continued

M31

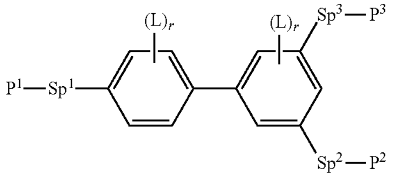

in which the individual radicals have the following meanings:

$P^1$, $P^2$ and $P^3$ each, independently of one another, denote an acrylate or methacrylate group, $Sp^1$, $Sp^2$ and $Sp^3$ each, independently of one another, denote a single bond or a spacer group having one of the meanings indicated above and below for Sp, and particularly preferably denote $—(CH_2)_{p1}—$, $—(CH_2)_{p1}—O—$, $—(CH_2)_{p1}—CO—O—$, $—(CH_2)_{p1}—O—CO—$ or $—(CH_2)_{p1}—O—CO—O—$, in which p1 is an integer from 1 to 12, where, in addition, one or more of the radicals $P^1$-$Sp^1$-, $P^1$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$- present is different from $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)═C(R^{00})—$, $—C≡C—$, $—N(R^0)—$, $—O—$, $—S—$, $—CO—$, $—CO—O—$, $—O—CO—$, $—O—CO—O—$ in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ each, independently of one another and identically or differently on each occurrence, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote $—CO—O—$, $—O—CO—$ or a single bond, $Z^1$ denotes $—O—$, $—CO—$, $—C(R^yR^z)—$ or $—CF_2CF_2—$, $Z^2$ and $Z^3$ each, independently of one another, denote $—CO—O—$, $—O—CO—$, $—CH_2O—$, $—OCH_2—$, $—CF_2O—$, $—OCF_2—$ or $—(CH_2)_n—$, where n is 2, 3 or 4, L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, x denotes 0 or 1.

Especially preferred are compounds of formulae M2, M13, M17, M22, M23, M24 and M30.

Further preferred are trireactive compounds M15 to M30, in particular M17, M18, M19, M22, M23, M24, M25, M26, M30 and M31.

In the compounds of formulae M1 to M31 the group

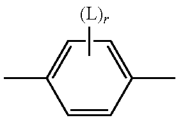

is preferably

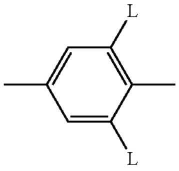 , 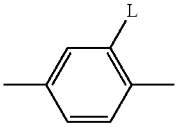 ,

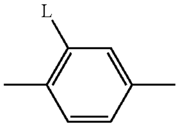 , 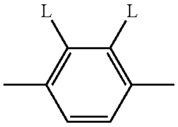 ,

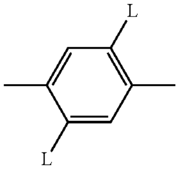 or 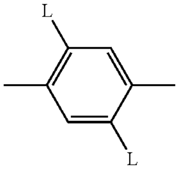 , wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, more preferably F, Cl, $CH_3$, $OCH_3$, $COCH_3$ or $OCF_3$, especially F or $CH_3$.

Besides the polymerisable compounds described above, the LC media for use in the LC displays according to the invention comprise an liquid-crystalline component B) or LC host mixture exhibiting dielectrically positive anisotropy, which preferably comprises one or more, more preferably two or more LC compounds, which are selected from low-molecular-weight compounds that are unpolymerisable.

These LC compounds are selected such that they stable and/or unreactive to a polymerisation reaction under the conditions applied to the polymerisation of the polymerisable compounds.

Preferred LC compounds, which can be employed in the liquid-crystalline component B) according to the invention, are indicated below:

A

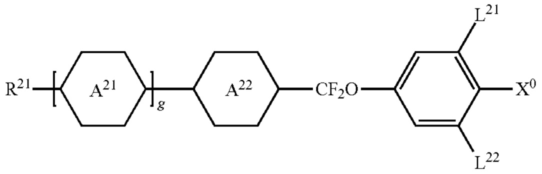

B

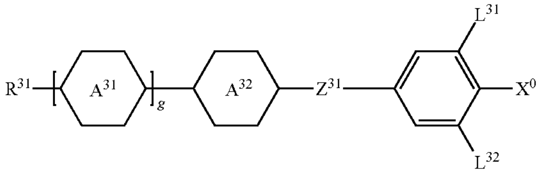

in which the individual radicals have, independently of each other and on each occurrence identically or differently, the following meanings:

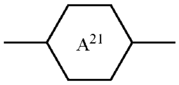
,
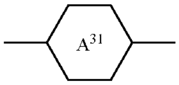
,
, each, independently of one another, and on each occurrence, identically or differently

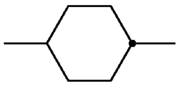
,
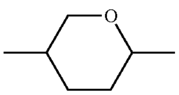
,
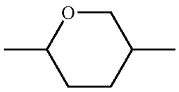
,
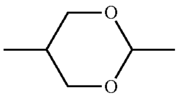
,
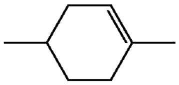
,
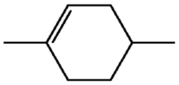
, -continued

,
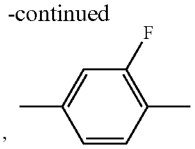
,
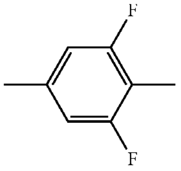
, $R^{21}$, $R^{31}$ each, independently of one another, alkyl, alkoxy, oxaalkyl or alkoxyalkyl having 1 to 9 C atoms or alkenyl or alkenyloxy having 2 to 9 C atoms, all of which are optionally fluorinated, $X^0$ F, Cl, CN, halogenated alkyl or alkoxy having 1 to 6 C atoms or halogenated alkenyl or alkenyloxy having 2 to 6 C atoms, $Z^{31}$ —$CH_2CH_2$—, —$CF_2CF_2$—, —COO—, trans-CH═CH—, trans-CF═CF—, —$CH_2O$— or a single bond, preferably —$CH_2CH_2$—,
—COO—, trans-CH═CH— or a single bond, particularly preferably —COO—, trans-CH═CH— or a single bond, $L^{21}$, $L^{22}$, $L^{31}$, $L^{32}$ each, independently of one another, H or F, g 0, 1, 2 or 3.

In the compounds of formula A and B, $X^0$ is preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or CH═$CF_2$, very preferably F or $OCF_3$, most preferably F.

In the compounds of formula A and B, $R^{21}$ and $R^{31}$ are preferably selected from straight-chain alkyl or alkoxy with 1, 2, 3, 4, 5 or 6 C atoms, and straight-chain alkenyl with 2, 3, 4, 5, 6 or 7 C atoms.

In the compounds of formula A and B, g is preferably 1 or 2.

In the compounds of formula B, $Z^{31}$ is preferably COO, trans-CH═CH or a single bond, very preferably COO or a single bond.

Preferably, component B) of the Cholesteric LC medium comprises one or more compounds of formula A selected from the group consisting of the following formulae:

A1

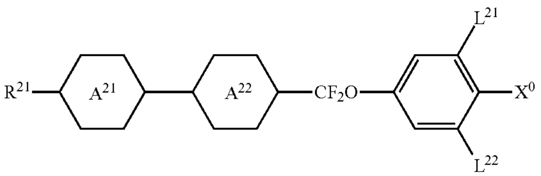

A2

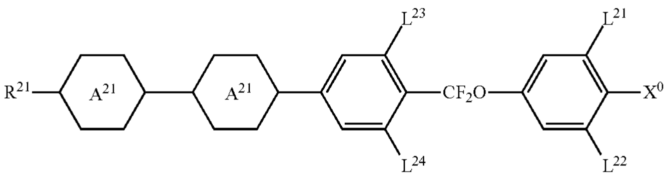

-continued

A3

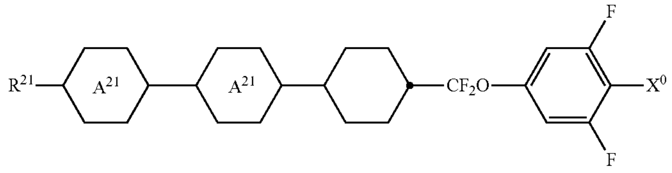

A4

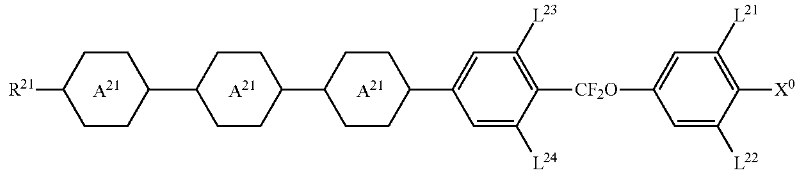

in which $A^{21}$, $R^{21}$, $X^0$, $L^{21}$ and $L^{22}$ have the meanings given in formula A, $L^{23}$ and $L^{24}$ each, independently of one another, are H or F, and $X^0$ is preferably F. Particularly preferred are compounds of formulae A1 and A2.

Particularly preferred compounds of formula A1 are selected from the group consisting of the following subformulae:

A1a

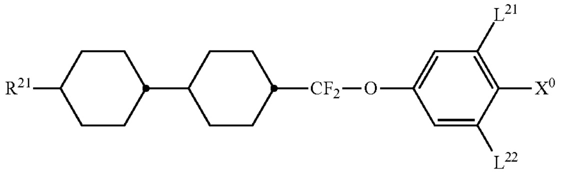

A1b

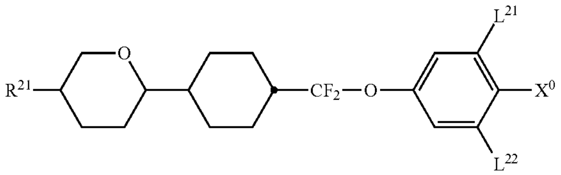

A1c

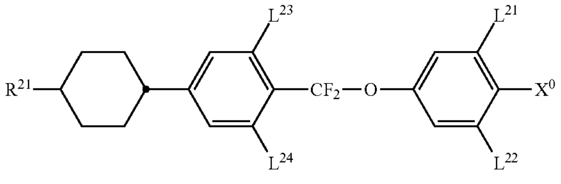

A1d

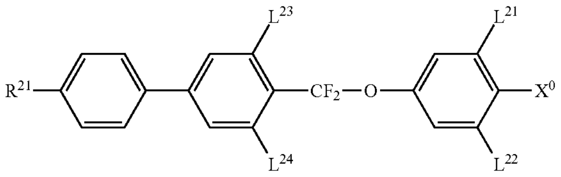

-continued

A1e

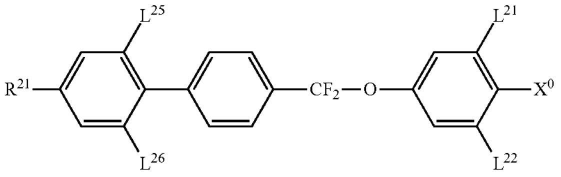

A1f

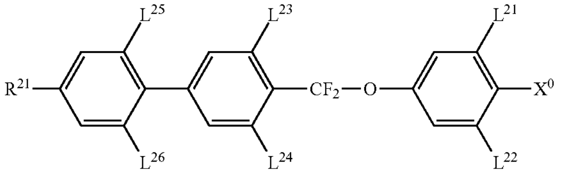

in which $R^{21}$, $X^0$, $L^{21}$ and $L^{22}$ have the meaning given in formula A1, $L^{23}$, $L^{24}$, $L^{25}$ and $L^{26}$ are each, independently of one another, H or F, and $X^0$ is preferably F.

Very particularly preferred compounds of formula A1 are selected from the group consisting of the following subformulae:

A1a1

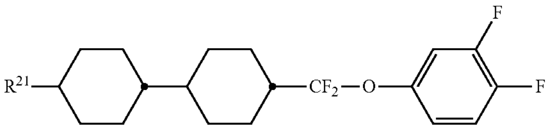

A1a2

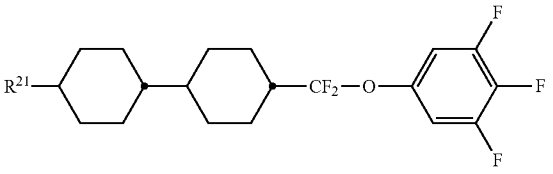

A1b1

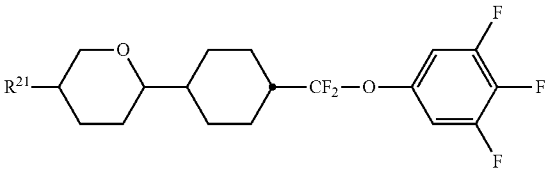

-continued

A1d1

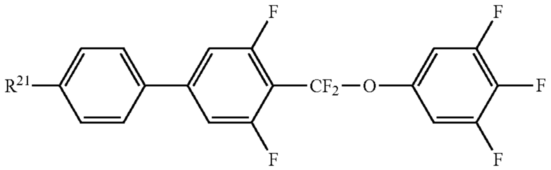

A1e1

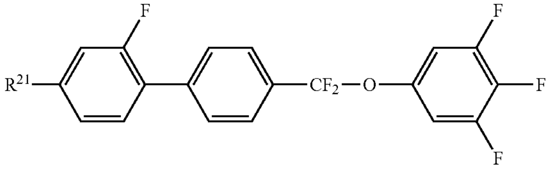

A1f1

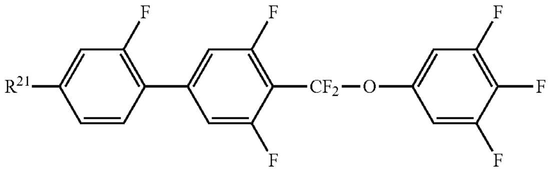

In which $R^{21}$ is as defined in formula A1.

Particularly preferred compounds of formula A2 are selected from the group consisting of the following subformulae:

A2a

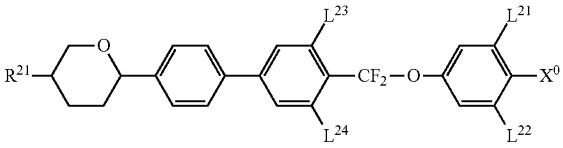

A2b

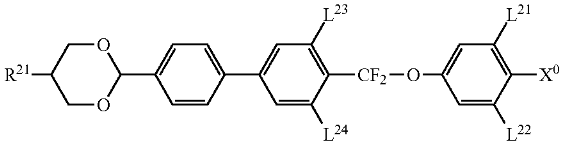

A2c

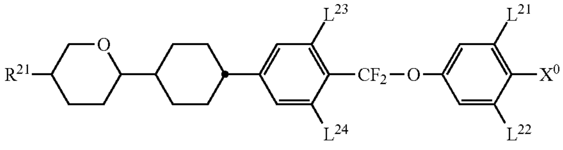

A2d

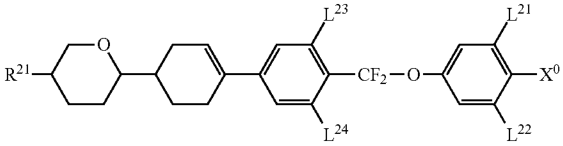

-continued

A2e

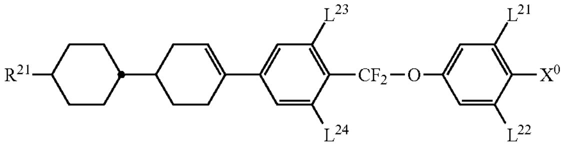

A2f

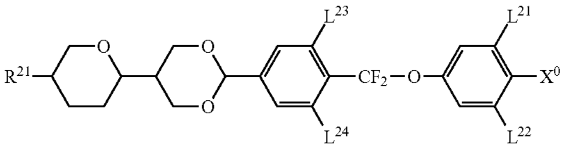

A2g

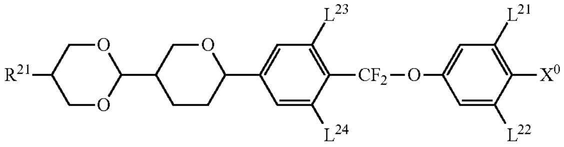

A2h

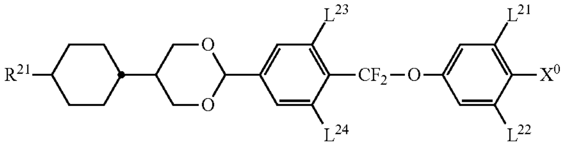

A2i

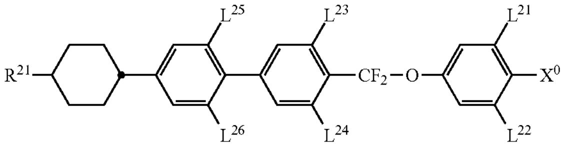

A2k

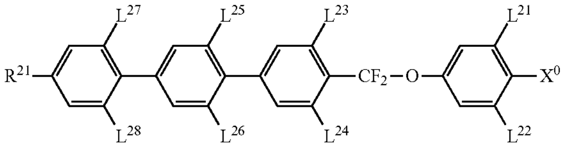

A2l

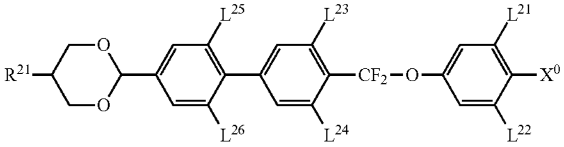

in which $R^{21}$, $X^0$, $L^{21}$ and $L^{22}$ have the meaning given in formula A2, $L^{23}$, $L^{24}$, $L^{25}$ and $L^{26}$ each, independently of one another, are H or F, and $X^0$ is preferably F.

Very particularly preferred compounds of formula A2 are selected from the group consisting of the following subformulae:

A2a1

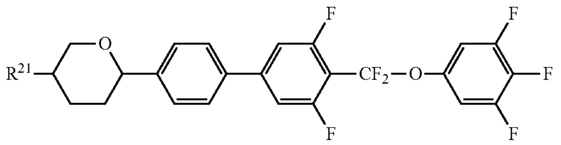

-continued

A2c1

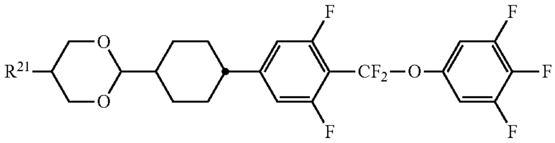

A2d1

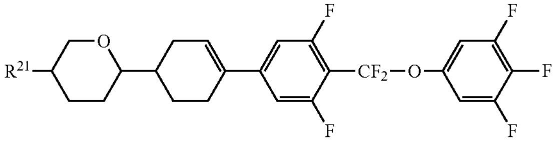

A2e1

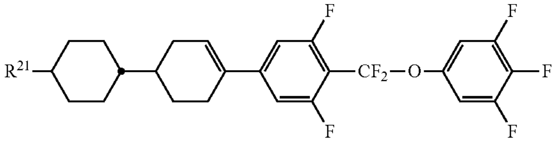

A2f1

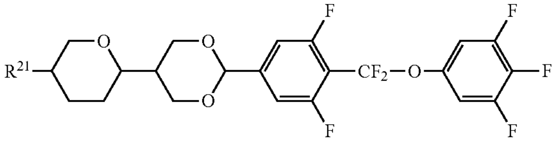

A2h1

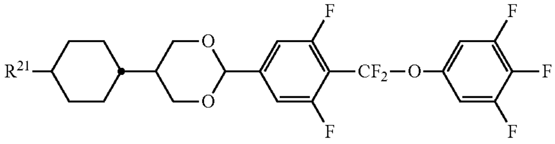

A2i1

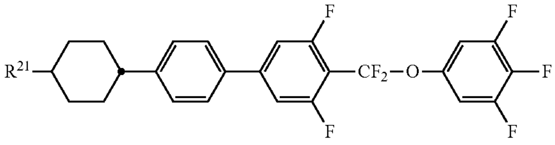

A2i2

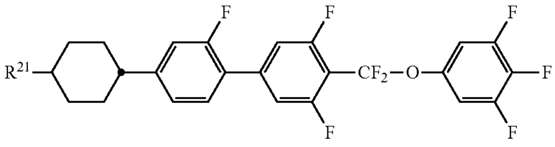

A2k1

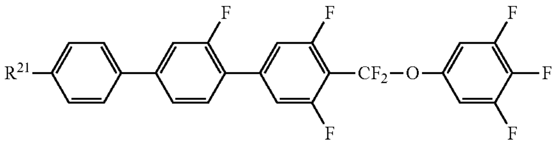

-continued

A2k2

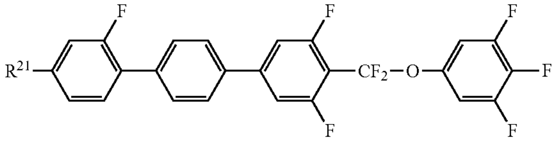

A2l2

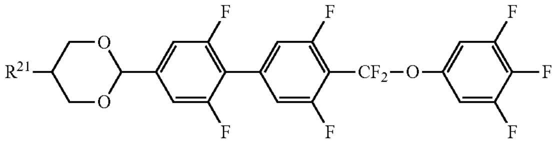

in which $R^{21}$ and $X^0$ are as defined in formula A2.

Particularly preferred compounds of formula A3 are selected from the group consisting of the following subformulae:

A3a

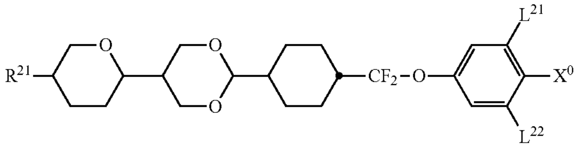

A3b

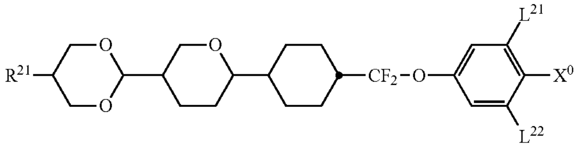

A3c

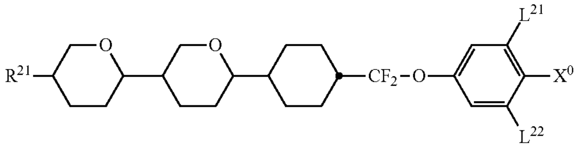

in which $R^{21}$, $X^0$, $L^{21}$ and $L^{22}$ have the meaning given in formula A3, and $X^0$ is preferably F.

Particularly preferred compounds of formula A4 are selected from the group consisting of the following subformulae:

A4a

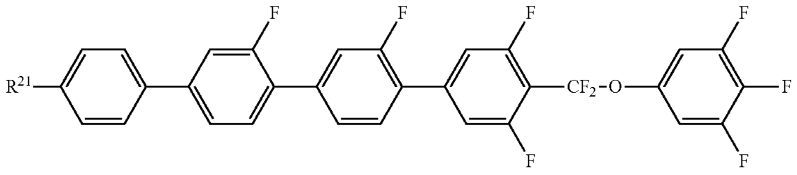

in which $R^{21}$ is as defined in formula A4.

Preferably, component B) of the Cholesteric LC medium comprises one or more compounds of formula B selected from the group consisting of the following formulae:

B1

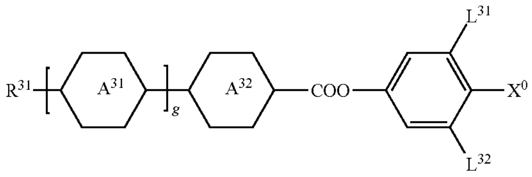

B2

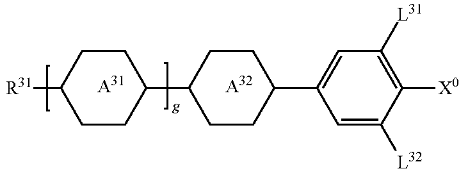

B3

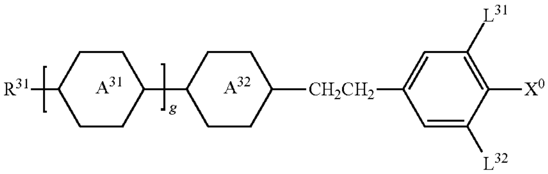

in which g, $A^{31}$, $A^{32}$, $R^{31}$, $X^0$, $L^{31}$ and $L^{32}$ have the meanings given in formula B, and $X^0$ is preferably F or CN. Particularly preferred are compounds of formulae B1 and B2.

Particularly preferred compounds of formula B1 are selected from the group consisting of the following subformulae:

B1a

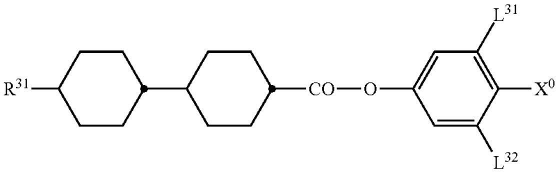

-continued

B1b

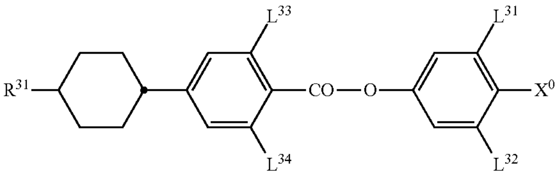

in which $R^{31}$, $X^0$, $L^{31}$ and $L^{32}$ have the meaning given in formula B1, and $X^0$ is preferably F.

Very particularly preferred compounds of formula B1a are selected from the group consisting of the following subformulae:

B1a1

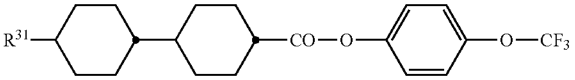

B1a2

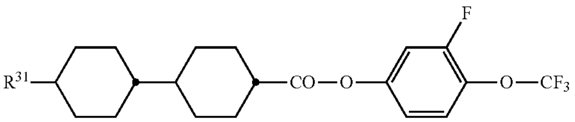

B1a3

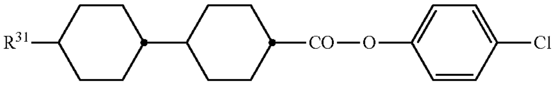

B1a4

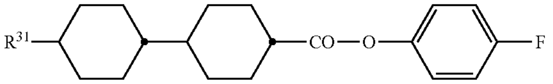

B1a5

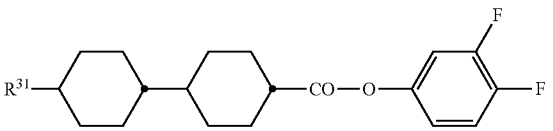

B1a6

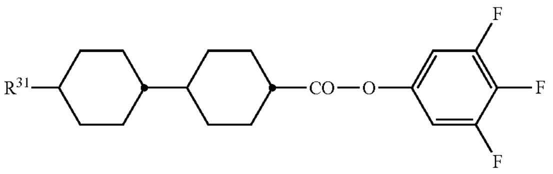

in which $R^{31}$ is as defined in formula B1.

Very particularly preferred compounds of formula B1 b are selected from the group consisting of the following subformulae:

B1b1

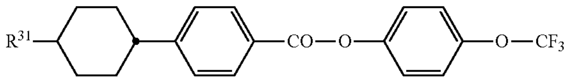

B1b2

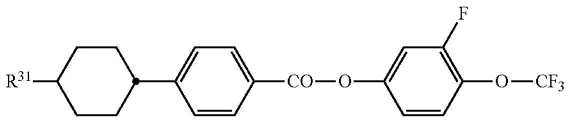

B1b3

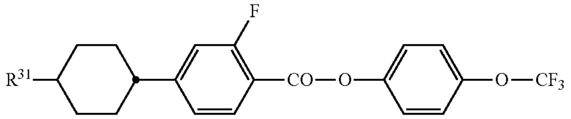

B1b4

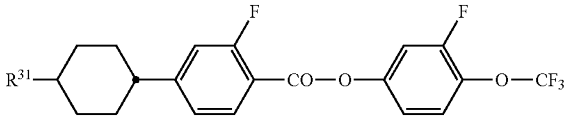

in which $R^{31}$ is as defined in formula B1.

Particularly preferred compounds of formula B2 are selected from the group consisting of the following subformulae:

B2a

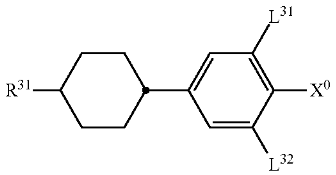

B2b

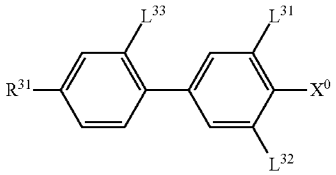

B2c

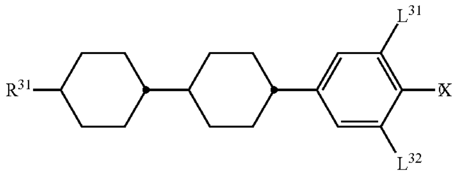

B2d

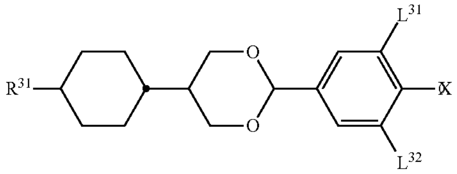

-continued

B2e

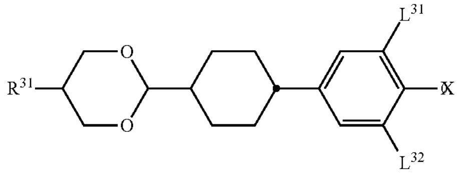

B2f

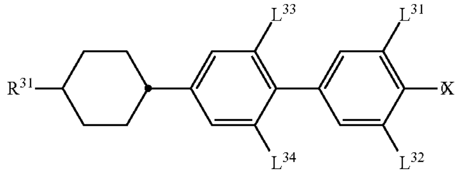

B2g

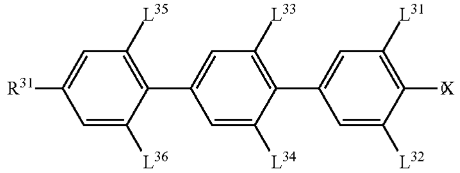

B2h

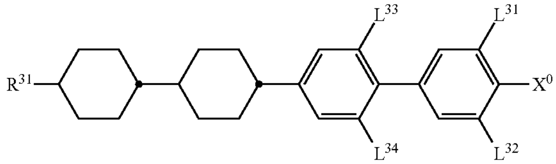

B2i

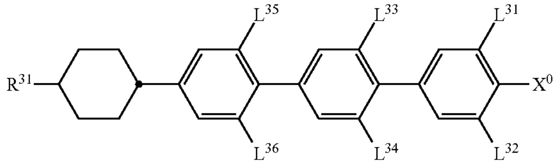

B2k

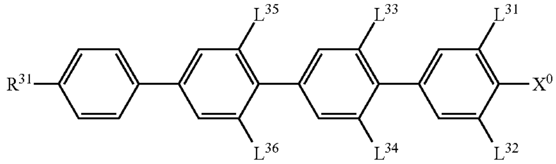

B2l

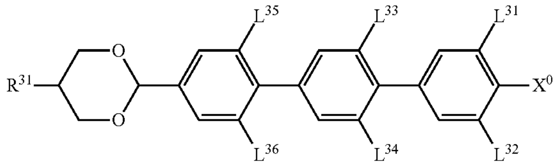

in which $R^{31}$, $X^0$, $L^{31}$ and $L^{32}$ have the meaning given in formula B2, $L^{33}$, $L^{34}$, $L^{35}$ and $L^{36}$ are each, independently of one another, H or F, and $X^0$ is preferably F or CN.

Very particularly preferred compounds of formula B2 are selected from the group consisting of the following subformulae:

B2a1

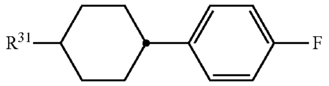

B2a2

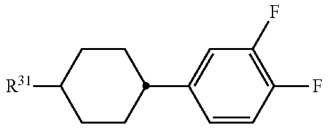

B2a3

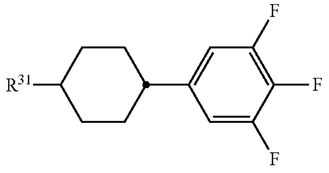

B2a4

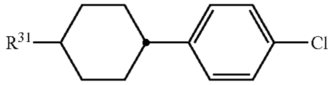

B2a5

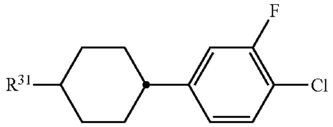

in which $R^{31}$ is as defined in formula B2.

Very particularly preferred compounds of formula B2b are selected from the group consisting of the following subformulae B2b1

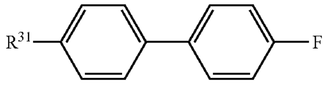

B2b2

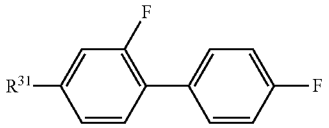

B2b3

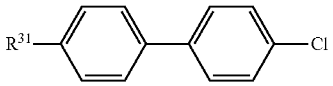

B2b4

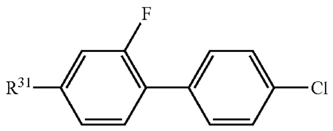

in which $R^{31}$ is as defined in formula B2.

Very particularly preferred compounds of formula B2c are selected from the group consisting of the following subformulae:

B2c1

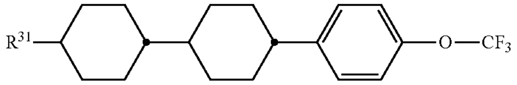

-continued

B2c2

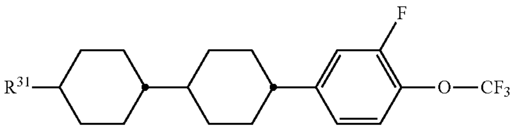

B2c3

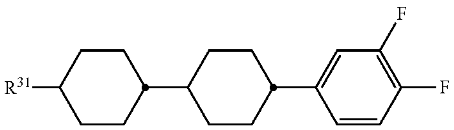

B2c4

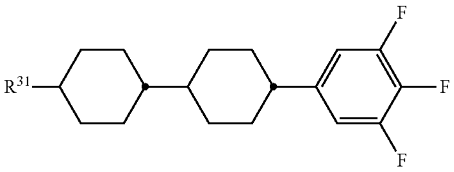

B2c5

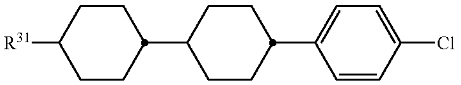

in which $R^{31}$ is as defined in formula B2.

Very particularly preferred compounds of formula B2d and B2e are selected from the group consisting of the following subformulae:

B2d1

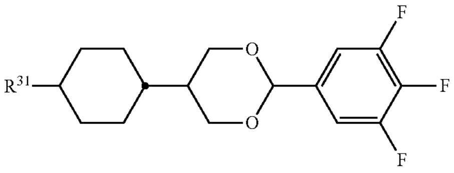

B2e1

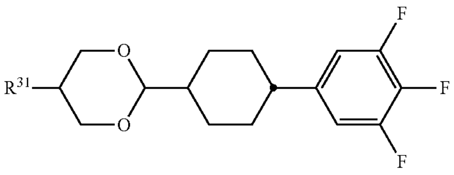

in which $R^{31}$ is as defined in formula B2.

Very particularly preferred compounds of formula B2f are selected from the group consisting of the following subformulae:

B2f1

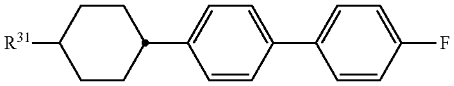

B2f2

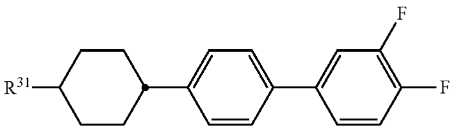

-continued

B2f3

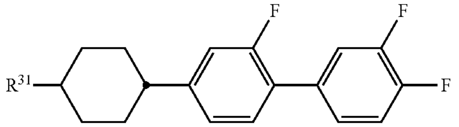

B2f4

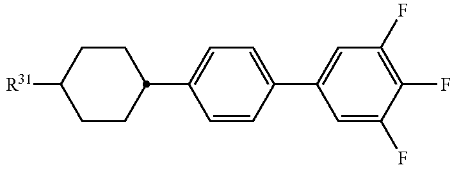

B2f5

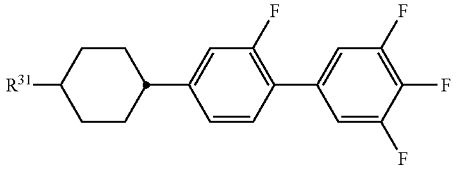

in which $R^{31}$ is as defined in formula B2.

Very particularly preferred compounds of formula B2g are selected from the group consisting of the following subformulae:

B2g1

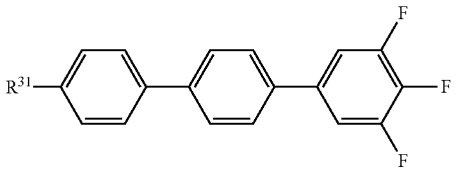

B2g2

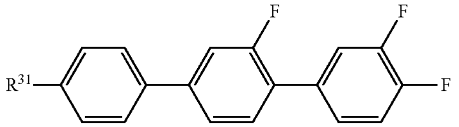

B2g3

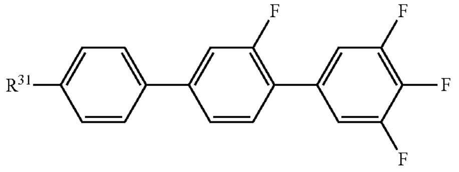

B2g4

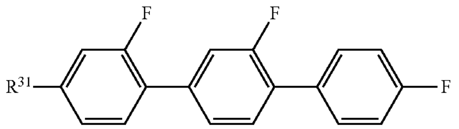

B2g5

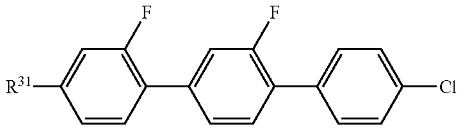

in which $R^{31}$ is as defined in formula B2.

Very particularly preferred compounds of formula B2h are selected from the group consisting of the following subformulae:

B2h1

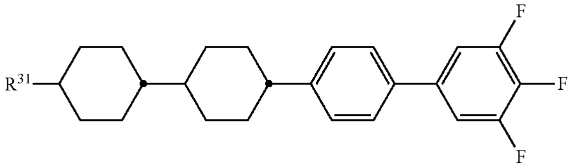

B2h2

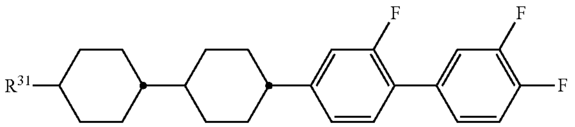

B2h3

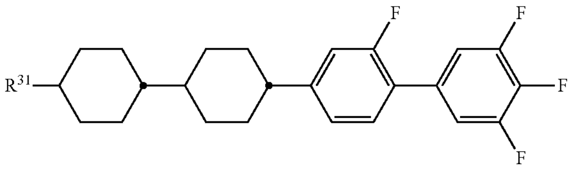

in which $R^{31}$ is as defined in formula B2.

Very particularly preferred compounds of formula B2i are selected from the group consisting of the following subformulae:

B2i1

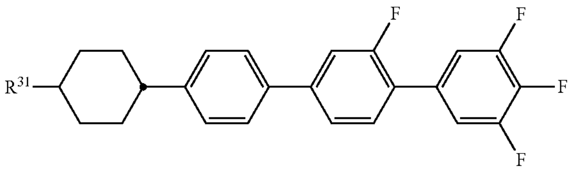

in which $R^{31}$ is as defined in formula B2.

Very particularly preferred compounds of formula B2k are selected from the group consisting of the following subformulae:

B2k1

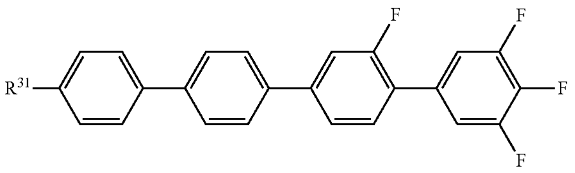

B2k2

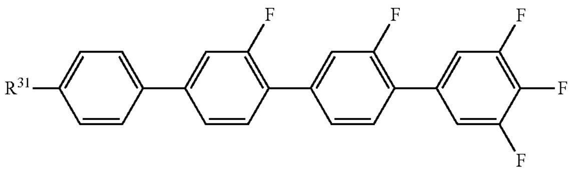

in which $R^{31}$ is as defined in formula B2.

Very particularly preferred compounds of formula B2l are selected from the group consisting of the following subformulae:

B2l1

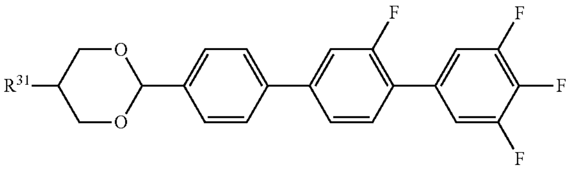

B2l2

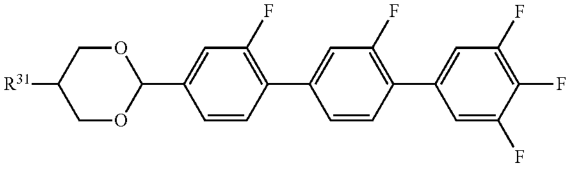

in which $R^{31}$ is as defined in formula B2.

Alternatively to, or in addition to, the compounds of formula B1 and/or B2 component B) of the Cholesteric LC medium may also comprise one or more compounds of formula B3 as defined above.

Particularly preferred compounds of formula B3 are selected from the group consisting of the following subformulae:

B3a

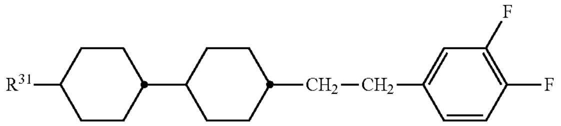

B3b

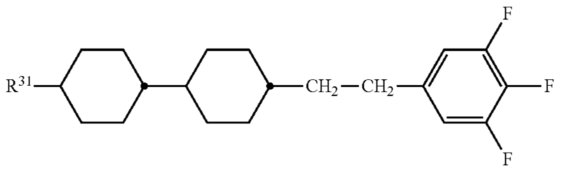

in which $R^{31}$ is as defined in formula B3.

Preferably, component B) of the Cholesteric LC medium comprises, in addition to the compounds of formula A and/or B, one or more compounds of formula C

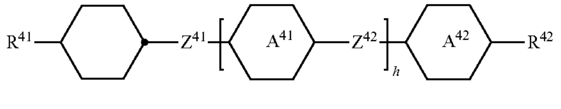

in which the individual radicals have the following meanings:

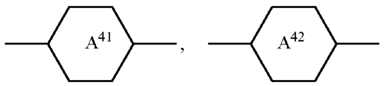

each, independently of one another, and on each occurrence, identically or differently

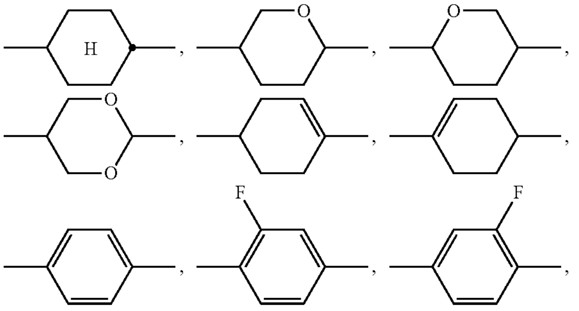

$R^{41}$, $R^{42}$ each, independently of one another, alkyl, alkoxy, oxaalkyl or alkoxyalkyl having 1 to 9 C atoms or alkenyl or alkenyloxy having 2 to 9 C atoms, all of which are optionally fluorinated, $Z^{41}$, $Z^{42}$ each, independently of one another, $-CH_2CH_2-$, $-COO-$, trans-$CH{=}CH-$, trans-$CF{=}CF-$, $-CH_2O-$, $-CF_2O-$, $-C{\equiv}C-$ or a single bond, preferably a single bond, h 0, 1, 2 or 3.

In the compounds of formula C, $R^{41}$ and $R^{42}$ are preferably selected from straight-chain alkyl or alkoxy with 1, 2, 3, 4, 5 or 6 C atoms, and straight-chain alkenyl with 2, 3, 4, 5, 6 or 7 C atoms.

In the compounds of formula C, h is preferably 0, 1 or 2.

In the compounds of formula C, $Z^{41}$ and $Z^{42}$ are preferably selected from COO, trans-CH=CH and a single bond, very preferably from COO and a single bond.

Preferred compounds of formula C are selected from the group consisting of the following subformulae:

C1

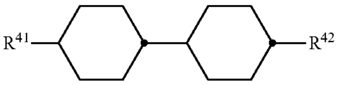

C2

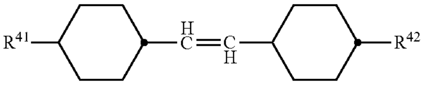

C3

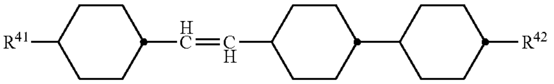

C4

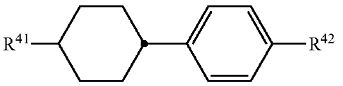

C5

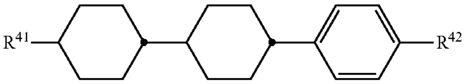

C6

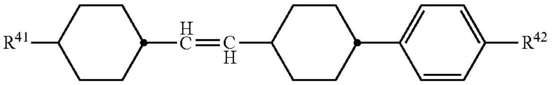

C7

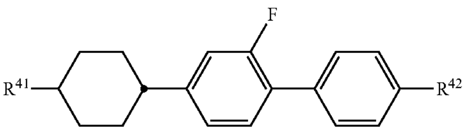

-continued

C8

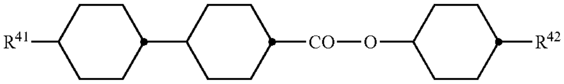

C9

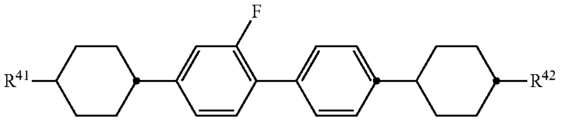

C10

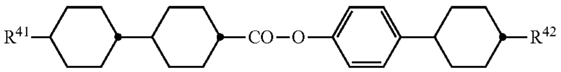

C11

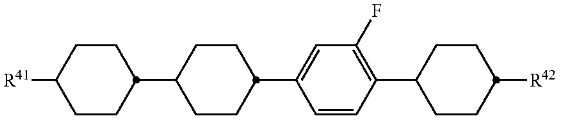

C12

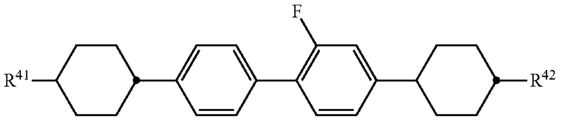

C13

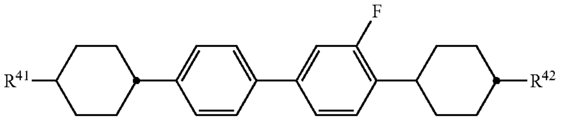

C14

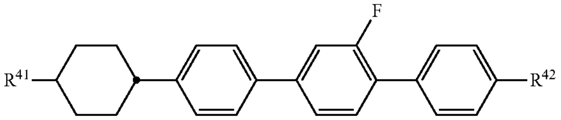

wherein $R^{41}$ and $R^{42}$ have the meanings given in formula C, and preferably denote each, independently of one another, alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms.

Preferably, the component B) of the Cholesteric LC medium comprises, in addition to the compounds of formula A and/or B, one or more compounds of formula D

D

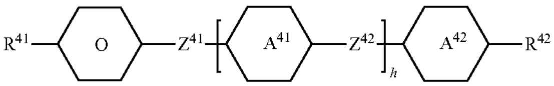

in which $A^{41}$, $A^{42}$, $Z^{41}$, $Z^{42}$, $R^{41}$, $R^{42}$ and h have the meanings given in formula C or one of the preferred meanings given above.

Preferred compounds of formula D are selected from the group consisting of the following subformulae:

D1

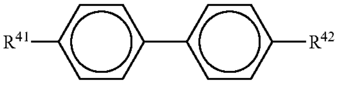

D2

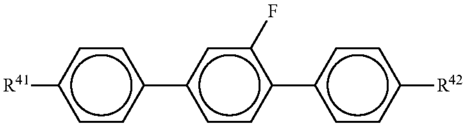

in which $R^{41}$ and $R^{42}$ have the meanings given in formula D and $R^{41}$ preferably denotes alkyl, and in formula D1 $R^{42}$ preferably denotes alkenyl, particularly preferably $—(CH_2)_2—CH{=}CH—CH_3$, and in formula D2 $R^{42}$ preferably denotes alkyl, $—(CH_2)_2—CH{=}CH_2$ or $—(CH_2)_2—CH{=}CH—CH_3$.

Preferably, the component B) of the Cholesteric LC medium comprises, in addition to the compounds of formula A and/or B, one or more compounds of formula E containing an alkenyl group

E

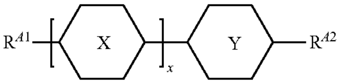

in which the individual radicals, on each occurrence identically or differently, each, independently of one another, have the following meaning:

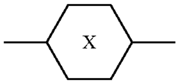 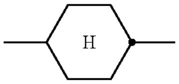 ,

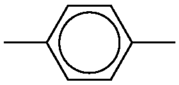 , 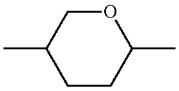 ,

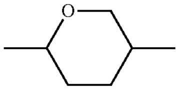 , 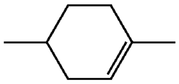 or

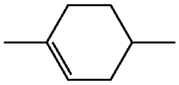 , 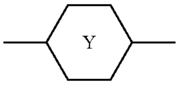

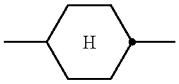 , 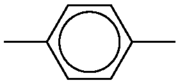 ,

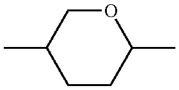 , 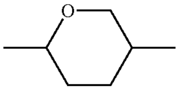 ,

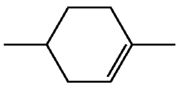 or 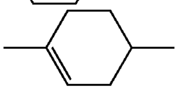 , $R^{41}$ alkenyl having 2 to 9 C atoms or, if at least one of the rings X, Y and Z denotes cyclohexenyl, also one of the meanings of $R^{42}$, $R^{42}$ alkyl having 1 to 12 C atoms, in which, in addition, one or two non-adjacent $CH_2$ groups may be replaced by —O—, —CH═CH—, —CO—, —OCO— or —COO— in such a way that O atoms are not linked directly to one another, x 1 or 2.

$R^{A2}$ is preferably straight-chain alkyl or alkoxy having 1 to 8 C atoms or straight-chain alkenyl having 2 to 7 C atoms.

Preferred compounds of formula E are selected from the following sub-formulae:

E1

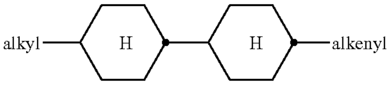

E2

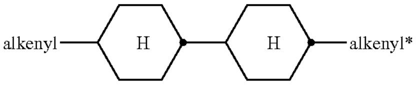

E3

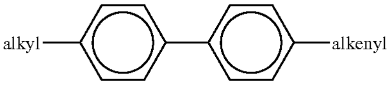

E4

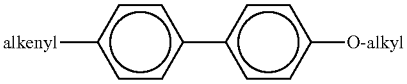

E5

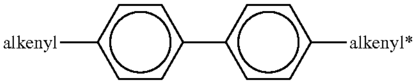

E6

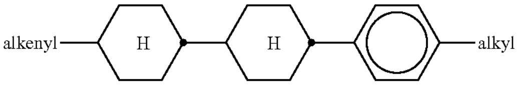

E7

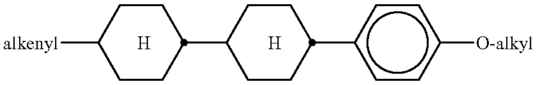

E8

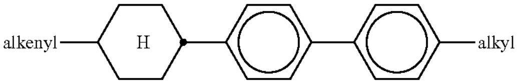

E9

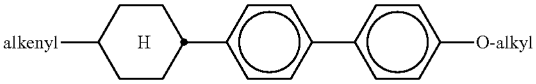

E10

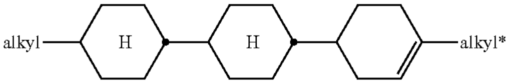

E11

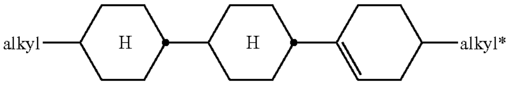

E12

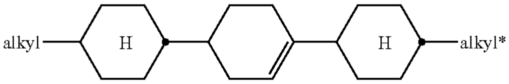

in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Very preferred compounds of the formula E are selected from the following sub-formulae:

E1a

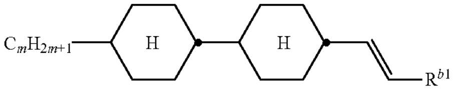

E3a

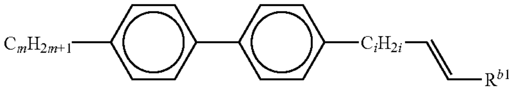

E6a

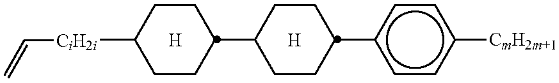

in which m denotes 1, 2, 3, 4, 5 or 6, i denotes 0, 1, 2 or 3, and $R^{b1}$ denotes H, $CH_3$ or $C_2H_5$.

Very particularly preferred compounds of the formula E are selected from the following sub-formulae:

E1a1

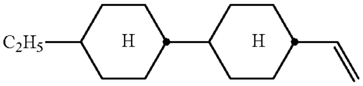

E1a2

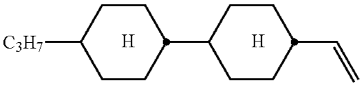

E!a3

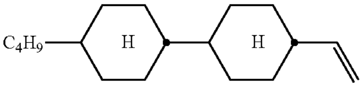

E1a4

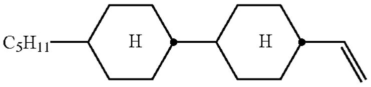

E1a5

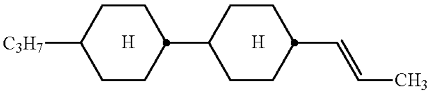

E3a1

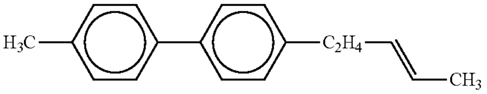

E6a1

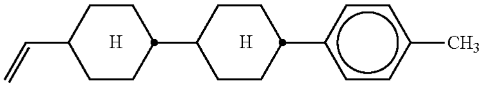

Most preferred are compounds of formula E1a2, E1a5, E3a1 and E6a1.

Preferably, the component B) of the Cholesteric LC medium comprises, in addition to the compounds of formula A and/or B, one or more compounds of formula F

F

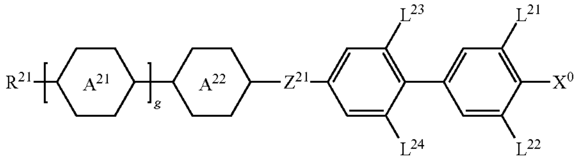

in which the individual radicals have, independently of each other and on each occurrence identically or differently, the following meanings:

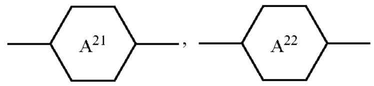

denote

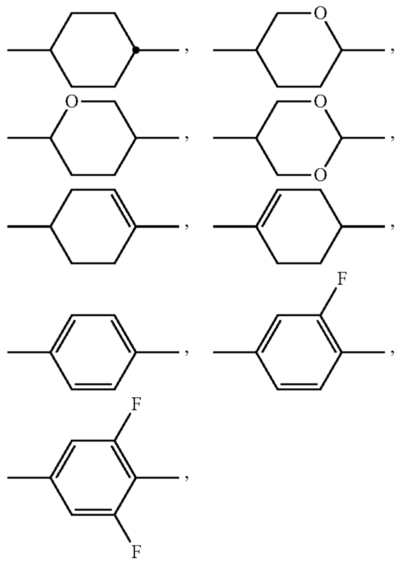

$R^{21}$, $R^{31}$ each, independently of one another, alkyl, alkoxy, oxaalkyl or alkoxyalkyl having 1 to 9 C atoms or alkenyl or alkenyloxy having 2 to 9 C atoms, all of which are optionally fluorinated, $X^0$ F, Cl, halogenated alkyl or alkoxy having 1 to 6 C atoms or halogenated alkenyl or alkenyloxy having 2 to 6 C atoms, $Z^{21}$ —$CH_2CH_2$—, —$CF_2CF_2$—, —COO—, trans-CH═CH—, trans-CF═CF—, —$CH_2O$— or a single bond, preferably —$CH_2CH_2$—, —COO—, trans-CH═CH— or a single bond, particularly preferably —COO—, trans-CH═CH— or a single bond, $L^{21}$, $L^{22}$, $L^{23}$, $L^{24}$ each, independently of one another, H or F, g 0, 1, 2 or 3.

Particularly preferred compounds of formula F are selected from the group consisting of the following formulae:

F1

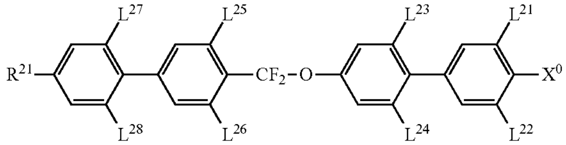

F2

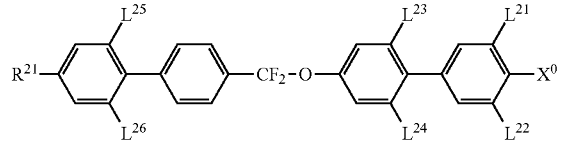

F3

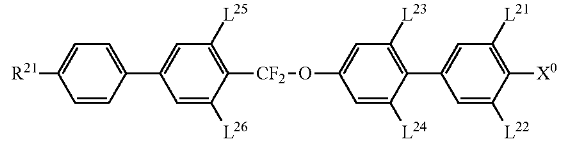

in which $R^{21}$, $X^0$, $L^{21}$ and $L^{22}$ have the meaning given in formula F, $L^{25}$ and $L^{26}$ are each, independently of one another, H or F, and $X^0$ is preferably F.

Very particularly preferred compounds of formula F1-F3 are selected from the group consisting of the following subformulae:

F1a

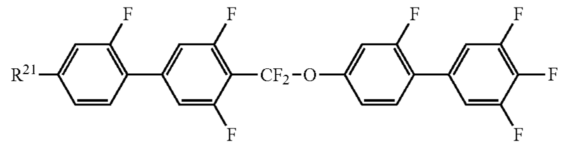

F1b

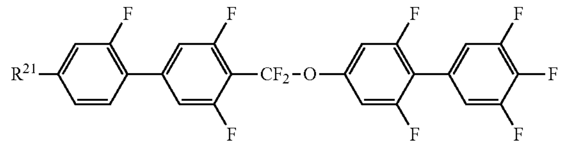

F2a

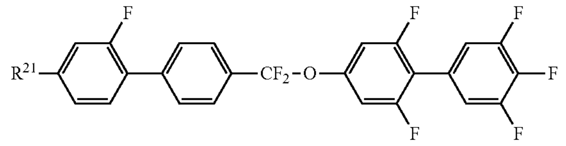

F2b

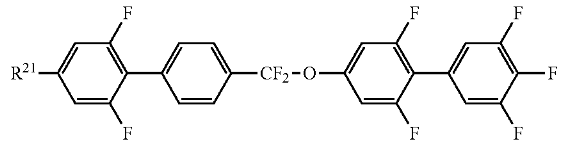

F3a

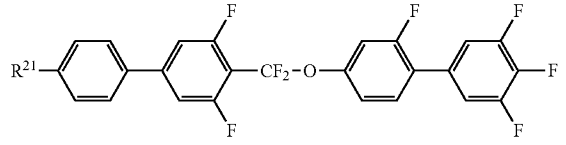

-continued

F3b

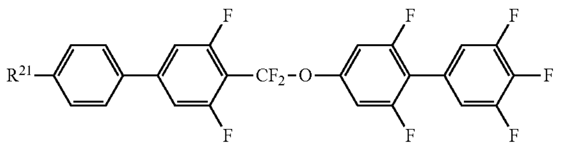

In which $R^{21}$ is as defined in formula F1.

The medium preferably comprises one or more neutral compounds of the general formula N,

N

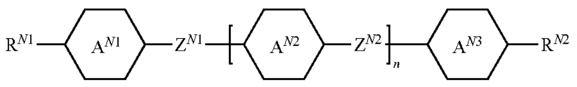

in which $R^{N1}$ and $R^{N2}$ each, independently of one another, denote an alkyl or alkoxy radical having 1 to 15 C atoms, where, in addition, one or more $CH_2$ groups in these radicals may each be replaced, independently of one another, by —C≡C—, —$CF_2O$—,

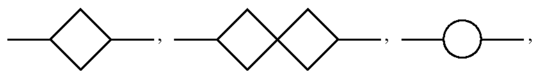

—CO—O—, —O—CO— in such a way that O atoms are not linked directly to one another, and in which, in addition, one or more H atoms may be replaced by halogen, rings $A^{N1}$, $A^{N2}$ and $A^{N3}$ each, independently of one another, denote 1,4-phenylene, 2-fluoro-1,4-phenylene, 3-fluoro-1,4-phenylene, 2,6-difluoro-1,4-phenylene, 3,5-difluoro-1,4-phenylene trans-1,4-cyclohexylene, in which, in addition, one or two $CH_2$ groups may be replaced by —O—, or 1,4-cyclohexenylene, $Z^{N1}$ and $Z^{N2}$ each, independently of one another, denote a single bond or —C≡C—, whereby at least one of $Z^{N1}$ and $Z^{N2}$ denotes —C≡C—, n denotes 0, 1 or 2.

Preferred compounds of the formula N are shown below:

N-1

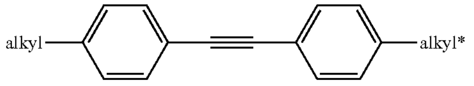

N-2

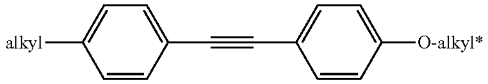

-continued

N-3

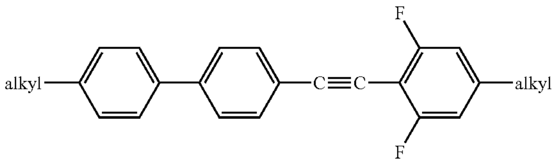

in which alkyl and alkyl* each, independently of one another, denote a straight-chain alkyl radical having 1 to 9 C atoms, preferably 2 to 6 C atoms, and alkenyl and alkenyl* each, independently of one another, denote a straight-chain alkenyl radical having 2-6 C atoms.

The concentration of the compounds of formula A and B in the LC host mixture is preferably from 2 to 60%, very preferably from 3 to 55%, most preferably from 4 to 50%.

The concentration of the compounds of formula C and D in the LC host mixture is preferably from 5 to 75%, very preferably from 10 to 70%, most preferably from 15 to 60%.

The concentration of the compounds of formula E in the LC host mixture is preferably from 5 to 30%, very preferably from 10 to 25%.

The concentration of the compounds of formula F in the LC host mixture is preferably from 2 to 30%, very preferably from 5 to 20%.

Further preferred embodiments of the present invention are listed below, including any combination thereof.

2a) The LC host mixture comprises one or more compounds of formula A and/or B with high positive dielectric anisotropy, preferably with $\Delta\varepsilon>15$.

2b) The LC host mixture comprises one or more compounds selected from the group consisting of formulae A1a2, A1 b1, A1d1, A1f1, A2a1, A2h1, A2l2, A2k1, B2g3, and/or B2F. The proportion of these compounds in the LC host mixture is preferably from 5 to 50.

2c) The LC host mixture comprises one or more compounds selected from the group consisting of formulae C3, C4, C5, C9 and D2. The proportion of these compounds in the LC host mixture is preferably from 8 to 75%, very preferably from 10 to 70%.

2d) The LC host mixture comprises one or more compounds selected from the group consisting of formulae E1, E3 and E6, preferably E1a, E3a and E6a, very preferably E1a2, E1a5, E3a1 and E6a1. The proportion of these compounds in the LC host mixture is preferably from 5 to 40%, very preferably from 10 to 25%.

The optimum mixing ratio of the compounds of the above-mentioned formulae in the liquid-crystalline component B) depends substantially on the desired properties, on the choice of the components of the above-mentioned formulae and on the choice of any further components that may be present. Preferred physical properties are given in the following.

In a preferred embodiment, the liquid-crystalline component B) according to the invention are characterised by optical anisotropy values as high as possible. Preferably, the liquid-crystalline component B) exhibits an optical anisotropy (Δn) in the range from 0.05 or more to 0.500 or less, more preferably in the range from 0.100 or more to 0.300 or less, especially in the range from 0.150 or more to 0.250 or less.

Preferably, the liquid-crystalline component B) according to the invention is characterised by relatively high positive values of the dielectric anisotropy (Δε), preferably as high as possible. In a preferred embodiment, the liquid-crystalline component B) exhibits a dielectrically positive anisotropy in the range from 3 to 50, preferably from 4 or more to 25 or less, particularly preferably from 5 or more to 20 or less.

The nematic phase of the liquid-crystalline component B) according to the invention preferably extends at least from 0° C. or below to 70° C. or above, more preferably at least from −20° C. or below to 75° C. or above, very preferably at least from −30° C. or below to 75° C. or above and in particular at least from −40° C. or below to 80° C. or above.

The clearing point of the liquid-crystalline component B) according to the invention is preferably in the range from 10° C. to 120° C., particularly preferably in the range from 40° C. to 110° C. and very particularly preferably in the range from 60° C. to 100° C.

The rotational viscosity of the liquid-crystalline component B) is preferably as low as possible. Preferably, the liquid-crystalline component B) exhibits a rotational viscosity of approximately 500 mPas or less, preferably in the range from 1 mPas or more to 500 mPas or less, more preferably in the range from 10 mPas or more to 300 mPas or less, especially in the range from 50 mPas to 200 mPas.

The cholesteric medium in accordance with the present invention comprises one or more chiral dopants or a chiral component C).

Preferably, the cholesteric LC Medium according to the present invention comprises one or more chiral compounds having each alone or in combination with each other an absolute value of the helical twisting power ($|HTP_{total}|$) of 5 $\mu m^{-1}$ or more, preferably 10 $\mu m^{-1}$ or more, more preferably 15 $\mu m^{-1}$ or more.

Preferred are chiral dopants with the higher helical twisting power (HTP), in particular those disclosed in WO 98/00428.

Typically, used chiral dopants are e.g. the commercially available R/S-5011, CD-1, R/S-811 and CB-15 (from Merck KGaA, Darmstadt, Germany).

R-5011 and S-5011 are enantiomers of (13bR)-5,6-dihydro-5-(trans-4-propylcyclohexyl)-4H-dinaphtho[2,1-f:1',2'-h][1,5]dioxonine, CD1 is R-(−)-2,2'-bis(diphenoxyphosphinyl)-1,1'-binaphthyl, S-811 is S-(+)-2-Octyl 4-(4-hexyloxybenzoyloxy)benzoate, R-811 is (R)-2-Octyl 4-((4-(hexyloxy)benzoyl)oxy)benzoate, and CB-15 is 4'-[(S)-2-methylbutyl]-[1,1'-biphenyl]-4-carbonitrile In another preferred embodiment, the chiral dopants are preferably selected from formula Ch I, Ch I

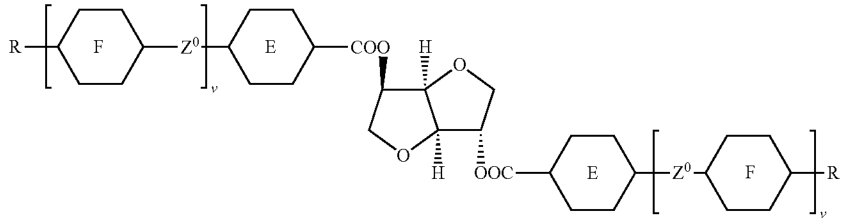

and/or formula Ch II,

Ch II

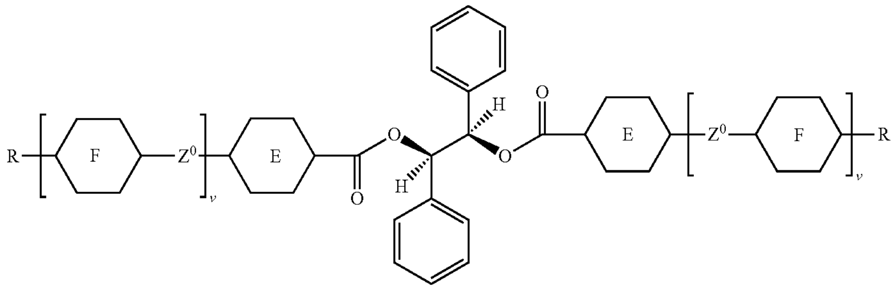

including the respective (S,S) enantiomer, wherein E and F are each independently 1,4-phenylene or trans-1,4-cyclohexylene, v is 0 or 1, $Z^0$ is —COO—, —OCO—, —$CH_2CH_2$— or a single bond and R is alkyl, alkoxy or alkanoyl with 1 to 12 C atoms.

The compounds of formula Ch I and their synthesis are described in WO 98/00428. The compounds of formula Ch II and their synthesis are described in GB 2,328,207.

The above-mentioned chiral dopants R/S-5011 and the compounds of formula Ch I and Ch II exhibit a very high helical twisting power (HTP) and are therefore particularly useful for the purpose of the present invention.

The liquid crystalline medium preferably comprises preferably 1 to 5, in particular 1 to 3, very preferably 1 or 2 chiral dopants, preferably selected from the above formula Ch I, and/or formula Ch II and/or R-5011 or S-5011, very preferably, the chiral compound is R-5011, S-5011.

Typically the amount of chiral compounds having an absolute value of the helical twisting power ($|HTP_{total}|$) of 5 $\mu m^{-1}$ or more as a whole in the cholesteric liquid crystalline medium is preferably from ≥0.1 to ≥0.9% by weight of the total mixture.

The cholesteric LC media should in addition be of such a nature that different reflection wavelengths, in particular in the infrared region, can be achieved by simple and targeted variation. Preferably the cholesteric pitch of the cholesteric LC Medium is selected such, that their wavelength of reflection is in the in the range in the infrared range of the electromagnetic spectrum i.e. in the range from of 800 nm to 5000 nm, more preferably form 1000 to 4000 nm. In particular, the reflection wavelength of the liquid crystalline medium is in the range of 2000 nm to 3500 nm.

The cholesteric LC media according to the present invention are prepared in a manner conventional per se, for example by mixing one or more of the above-mentioned polymerisable compounds with one or more non-polymerisable compounds and one or more chiral compounds, both as defined above, and optionally with further liquid-crystalline compounds and/or additives.

In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. Accordingly, the invention also relates to the process for the preparation of the cholesteric LC media according to the invention.

The cholesteric LC media according to the present invention are very suitable for the use in different types of PNLC light modulation elements. Therefore, the present invention also relates to the use of an cholesteric LC medium as described and below in a PNLC light modulation element.

Accordingly, the present invention also relates to the PNLC light modulation element comprising a pair of opposing substrates, an electrode structure, preferably an in-plane electrode structure, a cholesteric LC medium located in the interspace of said substrates, characterized in that the PNLC light modulation element comprises a polymer network obtainable from the Cholesteric LC medium according as described above by exposing said Cholesteric LC medium to actinic radiation that induces photopolymerisation of the polymerisable compounds in the Cholesteric LC medium.

The invention furthermore relates to a process for the production of a PNLC light modulation element comprising at least the steps of

- cutting and cleaning of the substrates,
- providing the electrode structure on one or both substrates,
- optionally providing an alignment layer on the electrode structure,
- assembling the cell,
- filling the cell with the cholesteric LC medium according to the present invention, and
- exposing said cholesteric LC medium to actinic radiation that induces photopolymerisation of the polymerisable compounds in the LC medium.

In one embodiment of the present invention, the cholesteric LC medium is injected between the first and second substrates or is filled into the assembled cell by capillary force or vacuum filing after combining the first and second substrates.

However, it is likewise preferable that the liquid crystal composition may be interposed between the first and second substrates by combining the second substrate to the first substrate after loading the liquid crystal composition on the first substrate. In a preferred embodiment, the liquid crystal is dispensed dropwise onto a first substrate in a process known as "one drop filling" (ODF) process, as disclosed in for example JPS63-179323 and JPH10-239694, or using the Ink Jet Printing (IJP) method In the irradiation step, the cell is exposed to actinic radiation that causes photopolymerisation of the polymerisable functional groups of the polymerisable compounds contained in the cholesteric liquid crystal medium.

Polymerisation is achieved for example by exposing the polymerisable material to heat or preferably actinic radiation. Actinic radiation means irradiation with light, like UV light, IR light or visible light, irradiation with X-rays or gamma rays or irradiation with high-energy particles, such as ions or electrons.

Preferably, polymerisation is carried out by UV irradiation. As a source for actinic radiation, for example a single UV lamp or a set of UV lamps can be used. Another possible source for actinic radiation is a laser, like for example a UV, IR or visible laser.

Because of the irradiation, the polymerisable compounds are substantially crosslinked in situ within the liquid crystal medium between the substrates forming the PNLC light modulation element whereby the polymer network is formed which preferably extends through the whole switching layer.

As a consequence, the formed polymer network reduces the effective cell gap to something much smaller than the typical cell gaps normally considered for LC cells. This allows for much faster switching and relaxation of the focal conic texture back to the aligned helical twist. Instead of switch times in the order of 10 seconds or more, the switching time can be reduced to the order of (sub-)milliseconds.

The utilized wavelength of the actinic radiation should not be too low, in order to avoid damage to the LC molecules of the medium, and should preferably be different from, very preferably higher than, the UV absorption maximum of the LC host mixture.

On the other hand, the wavelength of the photo radiation should not be too high, to allow quick and complete UV photopolymerisation of the polymerisable compounds, and should be not higher than, preferably the same as or lower than the UV absorption maximum of the polymerisable component.

Suitable wavelengths are preferably selected from wavelengths in the range from 250 to 450 nm, for example 400 nm or less, preferably 350 nm or less, more preferably 300 nm or less.

The irradiation or exposure time should be selected such that polymerisation is as complete as possible, but still not be too high to allow a smooth production process. In addition, the radiation intensity should be high enough to allow quick and complete polymerisation as possible, but should not be too high to avoid damage to the cholesteric liquid crystal medium.

The curing time depends, inter alia, on the reactivity of the polymerisable material, the thickness of the coated layer, the type of polymerisation initiator and the power of the UV lamp. The curing time is preferably 10 minute, very preferably 5 minutes, and most preferably 1 minutes. In general, for mass production shorter curing times are preferred, such as approximately 60 seconds to 1 second.

A suitable UV radiation power is preferably in the range from 5 to 150 $mWcm^{-2}$, more preferably in the range from 10 to 75 $mWcm^{-2}$, especially in the range from 25 to 60 $mWcm^{-2}$, and in particular 45 to 55 $mWcm^{-2}$.

Polymerisation is preferably performed under an inert gas atmosphere, preferably in under a nitrogen atmosphere, but also polymerisation in air is possible.

Polymerisation is preferably performed at a temperature in the range from −10° C. to +70° C., more preferably 0° C. to +50° C., even more preferably +15° C. to +40° C.

In an preferred embodiment, the PNLC light modulation element can additionally be annealed after the polymerisation, preferably at a temperature above 20° C. and below 140° C., more preferably above 40° C. and below 130° C. and most preferably above 70° C. and below 120° C., in order to reach full conversion of the monomers and in order to achieve an optimum stability Typically, the structure of the PNLC light modulation element according to the invention corresponds to the conventional structure for displays, which is known to the person skilled in the art.

As substrate, for example, glass or quartz sheets or plastic films can be used. When using two substrates in case of curing by actinic radiation, at least one substrate has to be transmissive for the actinic radiation used for the polymerisation.

Suitable and preferred plastic substrates are for example films of polyester such as polyethyleneterephthalate (PET) or polyethylene-naphthalate (PEN), polyvinylalcohol (PVA), polycarbonate (PC) or triacetylcellulose (TAC), very preferably PET or TAC films. As birefringent substrates for example uniaxially stretched plastic films can be used. PET films are commercially available for example from DuPont Teijin Films under the trade name Melinex®.

In a preferred embodiment, the substrates are arranged with a separation in the range from approximately 1 μm to approximately 20 μm from one another, preferably in the range from approximately 3 μm to approximately 10 μm from one another, and more preferably in the range from approximately 3 μm to approximately 6 μm from one another. The layer of the cholesteric LC medium is thereby located in the interspace.

The substrate layers can be kept at a defined separation from one another, for example, by spacers, or projecting structures in the layer. Typical spacer materials are commonly known to the expert, as for example spacers made of plastic, silica, epoxy resins, or the like.

In a further preferred embodiment of the invention, the layer of the cholesteric LC medium is located between two flexible layers, for example flexible polymer films. The corresponding PNLC light modulation element according to the invention is consequently flexible and bendable and can be rolled up, for example. The flexible layers can represent the substrate layer, the alignment layer, and/or polarisers. Further layers, which are preferable flexible, may also, be present. For a more detailed disclosure of the preferred embodiments, in which the layer of the liquid-crystalline medium is located between flexible layers, reference is given to the application US 2010/0045924 A1.

Furthermore, an electrode arrangement and optionally further electrical components and connections are be present in the PNLC light modulation element according to the invention in order to facilitate electrical switching of the PNLC light modulation element, comparable to the switching of an LC display.

Preferably, the PNLC light modulation element comprises an electrode arrangement, which is capable to allow the application of an electric field, which is substantially in parallel to the substrate main plane or the cholesteric liquid-crystalline medium layer. Suitable electrode arrangements or in-plane electrode structures fulfilling this requirement are commonly known to the expert.

For example, the first substrate includes a pixel electrode and a common electrode for generating an electric field substantially parallel to the surface of the first substrate in the pixel region. Various kinds of displays having at least two electrodes on one substrate are known to the skilled person wherein the most significant difference is that either both the pixel electrode and the common electrode are structured, as it is typical for IPS displays, or only the pixel electrode is structured and the common electrode is unstructured, which is the case for FFS displays.

It has to be understood that the present invention refers to any kind of electrode configurations suitable for generating an electric field substantially parallel to a surface of the first substrate in the pixel region; mentioned above, i.e. IPS as well as FFS displays.

Suitable electrode materials are commonly known to the expert, as for example electrode structures made of metal or metal oxides, such as, for example indium tin oxide (ITO), which is preferred according to the present invention.

Thin films of ITO, for example, are preferably deposited on substrates by physical vapour deposition, electron beam evaporation, or sputter deposition techniques.

Preferably, the electrodes of the PNLC light modulation element are associated with a switching element, such as a thin film transistor (TFT) or thin film diode (TFD).

In a preferred embodiment, the PNLC light modulation element may comprise at least one dielectric layer. Typical dielectric layer materials are commonly known to the expert, such as, for example, SiOx, SiNx, Cytop, Teflon, and PMMA.

The dielectric layer materials can be applied onto the substrate or electrode layer by conventional coating techniques like spin coating, roll coating, blade coating, or vacuum deposition such as PVD or CVD. It can also be applied to the substrate or electrode layer by conventional printing techniques, which are known to the expert, like for example screen printing, offset printing, reel-to-reel printing, letterpress printing, gravure printing, rotogravure printing, flexographic printing, intaglio printing, pad printing, heat-seal printing, ink-jet printing or printing by means of a stamp or printing plate.

In a further preferred embodiment, the PNLC light modulation element comprises at least one alignment layer, which is preferably provided adjacent to the cholesteric LC medium. The PNLC light modulation element may have further alignment layers, which are in direct contact with the layer of the liquid-crystalline medium.

The alignment layers may also serve as substrate layers, so that substrate layers are not necessary in the PNLC light modulation element. If substrate layers are additionally present, the alignment layers are in each case arranged between the substrate layer and the layer of the liquid-crystalline medium.

Preferably, the alignment layer(s) induce(s) planar alignment, preferably throughout the entire liquid-crystalline medium.

Suitable planar alignment layer materials are commonly known to the expert, such as, for example, AL-3046 or AL-1254 both commercially available from JSR.

The alignment layer materials can be applied onto the substrate array or electrode structure by conventional coating techniques like spin coating, roll coating, dip coating or blade coating. It can also be applied by vapour deposition or conventional printing techniques, which are known to the expert, like for example screen printing, offset printing, reel-to-reel printing, letterpress printing, gravure printing, rotogravure printing, flexographic printing, intaglio printing, pad printing, heat-seal printing, ink-jet printing or printing by means of a stamp or printing plate.

In a preferred embodiment, the planar alignment layer is processed by rubbing or photo-alignment techniques known to the skilled person, preferably by rubbing techniques. Accordingly, a uniform preferred direction of the director can be achieved without any physical treatment of the cell like shearing of the cell (mechanical treatment in one direction), etc. The rubbing direction is uncritical and mainly influences only the orientation in which the polarizers have to be applied. However, preferred are antiparallel rubbed planar alignment layers. Typically the rubbing direction is in the range of +/−45°, more preferably in the range of +/−20°, even more preferably, in the range of +/−10, and in particular, in the range of the direction +/−5° with respect to the substrates largest extension.

In a further preferred embodiment of the invention, the PNLC light modulation element optionally comprises two or more polarisers, at least one of which is arranged on one side of the layer of the liquid-crystalline medium and at least one of which is arranged on the opposite side of the layer of the liquid-crystalline medium. The layer of the liquid-crystalline medium and the polarisers here are preferably arranged parallel to one another.

The polarisers can be linear polarisers. Preferably, precisely two polarisers are present in the PNLC light modulation element. In this case, it is furthermore preferred for the polarisers either both to be linear polarisers. If two linear polarisers are present in the PNLC light modulation element, it is preferred in accordance with the invention for the polarisation directions of the two polarisers to be crossed.

It is furthermore preferred in the case where two circular polarisers are present in the PNLC light modulation element for these to have the same polarisation direction, i.e. either both are right-hand circular-polarised or both are left-hand circular-polarised.

The polarisers can be reflective or absorptive polarisers. A reflective polariser in the sense of the present application reflects light having one polarisation direction or one type of circular-polarised light, while being transparent to light having the other polarisation direction or the other type of circular-polarised light. Correspondingly, an absorptive polariser absorbs light having one polarisation direction or one type of circular-polarised light, while being transparent to light having the other polarisation direction or the other type of circular-polarised light. The reflection or absorption is usually not quantitative; meaning that complete polarisation of the light passing through the polariser does not take place.

For the purposes of the present invention, both absorptive and reflective polarisers can be employed. Preference is given to the use of polarisers, which are in the form of thin optical films. Examples of reflective polarisers which can be used in the PNLC light modulation element according to the invention are DRPF (diffusive reflective polariser film, 3M), DBEF (dual brightness enhanced film, 3M), DBR (layered-polymer distributed Bragg reflectors, as described in U.S. Pat. Nos. 7,038,745 and 6,099,758) and APF (advanced polariser film, 3M).

Examples of absorptive polarisers, which can be employed in the PNLC light modulation elements according to the invention, are the Itos XP38 polariser film and the Nitto Denko GU-1220DUN polariser film. An example of a circular polariser, which can be used in accordance with the invention, is the APNCP37-035-STD polariser (American Polarizers). A further example is the CP42 polariser (ITOS). The PNLC light modulation element may furthermore comprise filters which block light of certain wavelengths, for example, UV filters. In accordance with the invention, further functional layers, such as, for example, protective films, heat-insulation films or metal-oxide layers, may also be present.

The functional principle of the PNLC light modulation element according to the invention will be explained in detail below. It is noted that no restriction of the scope of the claimed invention, which is not present in the claims, is to be derived from the comments on the assumed way of functioning.

In a first preferred embodiment, the retardation or phase change of the PNLC light modulation element according to the invention is dependent on the applied electric field. Preferably, the retardation gradually increases while applying an electric field with gradually increasing voltage.

In this preferred embodiment, the components A and B are selected dependently from one another in that way that birefringence of the polymerisable component A matches the birefringence of the component B. Preferably, the difference between values for the birefringence is below 10%, more preferably below 5% and more preferably below 3%.

The required applied electric field strength is mainly dependent on the electrode gap and the modulus of Δε of the LC mixture. The applied electric field strengths are typically lower than approximately 50 V/μm$^{-1}$, preferably lower than approximately 30 V/μm$^{-1}$ and more preferably lower than approximately 25 V/μm$^{-1}$. In particular, the applied electric field strengths is in the range from 1 V/μm$^{-1}$ to 20V/μm$^{-1}$.

Preferably, the applied driving voltage in order to switch the PNLC light modulation element should be as low as possible. Typically, the applied driving voltage is in the range from 2 V to approximately 20 V, more preferably in the range from approximately 5 V to approximately 10 V.

In this first preferred embodiment, the retardation change or phase change (Γ) is given in accordance with the following equation $$\Gamma = \frac{2\pi}{\lambda} d\Delta n_{eff}$$

wherein d is the layer thickness of the applied liquid crystalline medium, λ is the wavelength of the incident light and $n_{eff}$ is the effective birefringence induced by the reorientation of the LC in the applied field.

In a second preferred embodiment, the PNLC light modulation element according to the invention has a boundary state A and a boundary state B.

The PNLC light modulation element preferably has the boundary state A with a transmission $T_A$ when no electrical field is applied, the so called "off state" or transparent state.

The PNLC light modulation element preferably has another boundary state B when an electric field is applied, the so called "on state" or opaque state, whereby $$T_A > T_B.$$

In this second preferred embodiment, the components A and B are selected dependently from one another in that way that birefringence of the polymerisable component A differs from the birefringence of the component B. Preferably, the difference between values for the birefringence is more than 3%, more preferably more than 5% and more preferably more than 10%.

The required applied electric field strength is mainly dependent on the electrode gap and the modulus of $\Delta\varepsilon$ of the LC mixture. The applied electric field strengths are typically lower than approximately 50 V/$\mu m^{-1}$, preferably lower than approximately 30 V/$\mu m^{-1}$ and more preferably lower than approximately 25 V/$\mu m^{-1}$. In particular, the applied electric field strengths is in the range from 1 V/$\mu m^{-1}$ to 20V/$\mu m^{-1}$.

Preferably, the applied driving voltage in order to switch the PNLC light modulation element should be as low as possible. Typically, the applied driving voltage is in the range from 2 V to approximately 200 V, more preferably in the range from approximately 3 V to approximately 100 V, and even more preferably in the range from approximately 5 V to approximately 50 V.

The transmission change is governed by the strength of the applied field. With more field applied to the system, the degree of scatter increases, which causes a reduction in the intensity of forward propagating light, and an increase in light emitted in other directions. Hence for side-illuminated devices, the amount of light visible orthogonal to the illumination direction increases with increasing applied field strength.

As described above, the PNLC light modulation element of the present invention can be used in various types of optical and electro-optical devices. Accordingly, the present invention is also directed to the use of the PNLC light modulation element as described above in an optical or electro-optical device and to an optical or electro-optical device comprising the PNLC light modulation element according to the present invention.

Said optical and electro optical devices include, without limitation electro-optical displays, liquid crystal displays (LCDs), non-linear optic (NLO) devices, optical information storage devices, light shutters, Smart Windows, privacy windows, lenses, virtual reality devices and augmented reality devices.

It will be appreciated that many of the features described above, particularly of the preferred embodiments, are inventive in their own right and not just as part of an embodiment of the present invention. Independent protection may be sought for these features in addition to, or alternative to any invention presently claimed.

It will be appreciated that variations to the foregoing embodiments of the invention can be made while still falling within the scope of the invention. Alternative features serving the same, equivalent or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

The parameter ranges indicated in this application all include the limit values including the maximum permissible errors as known by the expert. The different upper and lower limit values indicated for various ranges of properties in combination with one another give rise to additional preferred ranges.

In the present application and especially in the following examples, the structures of the liquid crystal compounds are represented by abbreviations, which are also called "acronyms". The transformation of the abbreviations into the corresponding structures is straightforward according to the following three tables A to C. Table A lists the symbols used for the ring elements, table B those for the linking groups and table C those for the symbols for the left hand and the right hand end groups of the molecules.

All groups $C_nH_{2n+1}$, $C_mH_{2m+1}$, and $C_lH2_{l+1}$ are preferably straight chain alkyl groups with n, m and l C-atoms, respectively, all groups $C_nH_{2n}$, $C_mH_{2m}$ and $C_lH_{2l}$ are preferably $(CH_2)_n$, $(CH_2)_m$ and $(CH_2)_l$, respectively and —CH═CH— preferably is trans-respectively E vinylene.

TABLE A

| Ring Elements | | | |
|---|---|---|---|
| C | 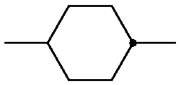 | P | 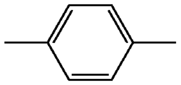 |
| D | 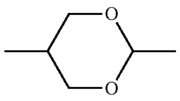 | DI | 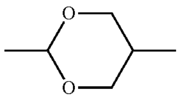 |

TABLE A-continued
| Ring Elements | | | |
|---|---|---|---|
| A | 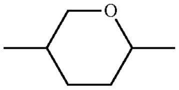 | AI | 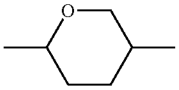 |
| G | 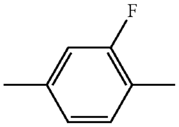 | GI | 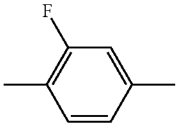 |
| U | 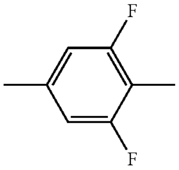 | UI | 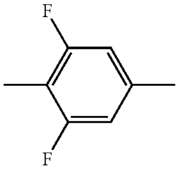 |
| Y | 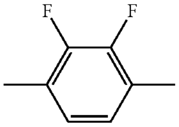 | | |
| M | 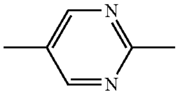 | MI | 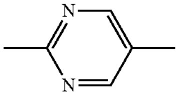 |
| N | 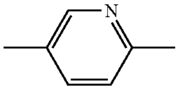 | NI | 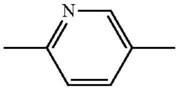 |
| np | 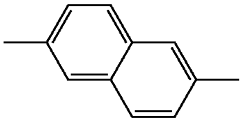 | | |
| n3f | 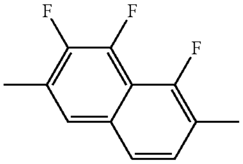 | n3fI | 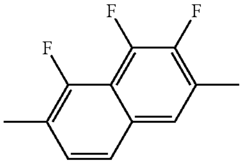 |
| th | 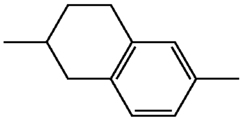 | thI | 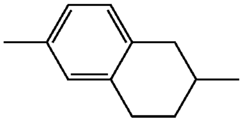 |
| th2f | 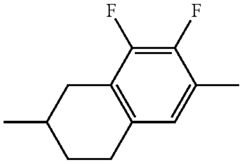 | th2fI | 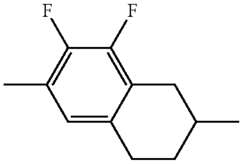 |
| o2f | 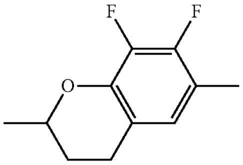 | o2fI | 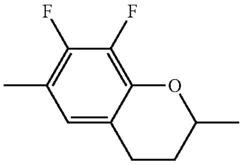 |

TABLE A-continued

| Ring Elements | | | |
|---|---|---|---|
| dh | 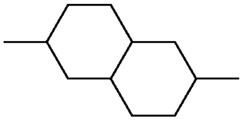 | | |
| K | 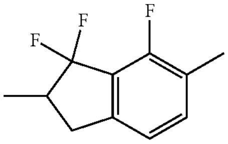 | Kl | 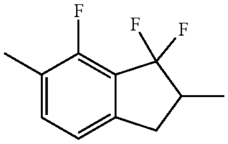 |
| L | 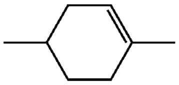 | Ll | 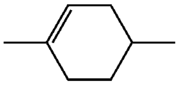 |
| F | 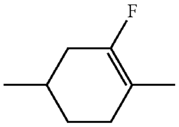 | Fl | 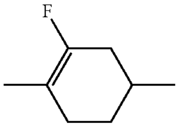 |

TABLE B

| Linking Groups | |
|---|---|
| E | $—CH_2—CH_2—$ |
| V | —CH═CH— |
| T | —C≡C— |
| W | $—CF_2—CF_2—$ |
| B | —CF═CF— |

TABLE B-continued

| Linking Groups | | | |
|---|---|---|---|
| Z | —CO—O— | ZI | —O—CO— |
| X | —CF═CH— | XI | —CH═CF— |
| O | $—CH_2—O—$ | OI | $—O—CH_2—$ |
| Q | $—CF_2—O—$ | QI | $—O—CF_2—$ |

TABLE C

| End Groups | | | |
|---|---|---|---|
| Left hand side, used alone or in combination with others | | Right hand side, used alone or in combination with others | |
| -n- | $C_nH_{2n+1}—$ | -n | $—C_nH_{2n+1}$ |
| -nO- | $C_nH_{2n+1}—O—$ | -nO | $—O—C_nH_{2n+1}$ |
| -V- | $CH_2═CH—$ | -V | $—CH═CH_2$ |
| -nV- | $C_nH_{2n+1}—CH═CH—$ | -nV | $—C_nH_{2n}—CH═CH_2$ |
| -Vn- | $CH_2═CH—C_nH_{2n}—$ | -Vn | $—CH═CH—C_nH_{2n+1}$ |
| -nVm- | $C_nH_{2n+1}—CH═CH—C_mH_{2m}—$ | -nVm | $—C_nH_{2n}—CH═CH—C_mH_{2m+1}$ |
| -N- | N≡C— | -N | —C≡N |
| -S- | S═C═N— | -S | —N═C═S |
| -F- | F— | -F | —F |
| -CL- | Cl— | -CL | —Cl |
| -M- | $CFH_2—$ | -M | $—CFH_2$ |
| -D- | $CF_2H—$ | -D | $—CF_2H$ |
| -T- | $CF_3—$ | -T | $—CF_3$ |
| -MO- | $CFH_2O—$ | -OM | $—OCFH_2$ |
| -DO- | $CF_2HO—$ | -OD | $—OCF_2H$ |
| -TO- | $CF_3O—$ | -OT | $—OCF_3$ |
| -A- | H—C≡C— | -A | —C≡C—H |
| -nA- | $C_nH_{2n+1}—C≡C—$ | -An | $—C≡C—C_nH_{2n+1}$ |
| -NA- | N≡C—C≡C— | -AN | —C≡C—C≡N |
| Left hand side, used in combination with others only | | Right hand side, used in combination with others only | |
| - . . . n . . . - | $—C_nH_{2n}—$ | - . . . n . . . | $—C_nH_{2n}—$ |
| - . . . M . . . - | —CFH— | - . . . M . . . | —CFH— |
| - . . . D . . . - | $—CF_2—$ | - . . . D . . . | $—CF_2—$ |
| - . . . V . . . - | —CH═CH— | - . . . V . . . | —CH═CH— |
| - . . . Z . . . - | —CO—O— | - . . . Z . . . | —CO—O— |
| - . . . ZI . . . - | —O—CO— | - . . . ZI . . . | —O—CO— |

TABLE C-continued

| End Groups | | | |
|---|---|---|---|
| - . . . K . . . - | —CO— | - . . . K . . . | —CO— |
| - . . . W . . . - | —CF═CF— | - . . . W . . . | —CF═CF— |

wherein n und m each are integers and three points " . . . " indicate a space for other symbols of this table.

EXAMPLES

Compounds

Utilized Polymerisable Liquid Crystalline Compounds—Component A)

RM-1

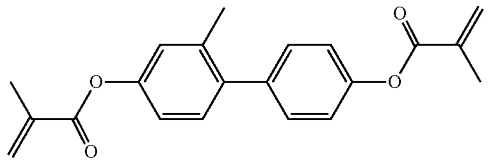

Utilized Host Mixtures—Component B)

| Mixture N-!: | | | |
|---|---|---|---|
| Composition [%-w/w] | | Physical properties | |
| PGP-3-2V | 5.0 | cl.p. [° C.]: | 71 |
| PGUQU-3-F | 6.0 | $n_e$ [589 nm, 20° C.]: | 1.7142 |
| PGUQU-4-F | 6.0 | $n_o$ [589 nm, 20° C.]: | 1.5145 |
| PGUQU-5-F | 6.0 | $\Delta n$ [589 nm, 20° C.]: | 0.1997 |
| CP-3-O1 | 6.0 | $\varepsilon_{\|}$ [1 kHz, 20° C.]: | 23.7 |
| PGP-1-2V | 6.0 | $\varepsilon_{\perp}$ [1 kHz, 20° C.]: | 4.4 |
| PGP-2-2V | 7.0 | $\Delta\varepsilon$ [1 kHz, 20° C.]: | 19.4 |
| CC-3-V | 8.0 | $K_1$ [pN, 20° C.]: | 16.6 |
| CPU-3-F | 10.0 | $K_3$ [pN, 20° C.]: | 21.2 |
| PGU-2-F | 10.0 | | |
| PGU-3-F | 10.0 | $\gamma_1$ [mPa s, 20° C.]: | 161 |
| PP-1-2V1 | 10.0 | | |
| PP-2-N | 10.0 | | |
| Σ | 100.0 | | |

Utilized Chiral Compounds—Component C)

R-5011

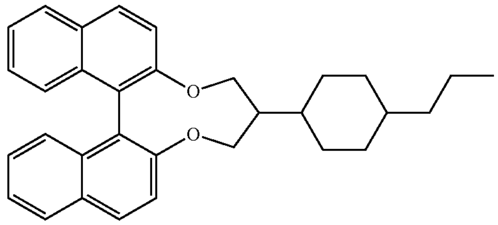

Test Cells

Test cell 1: VHR AL16301 Type

Cell gap=6 μm, no spacer

Cell type=Antiparallel planar alignment type PI

Electrode structure=ITO=200A, 1 cm×1 cm square pattern.

Test cell 2: VHR AL6301 Type

Cell gap=6 μm, no spacer

Cell type=Antiparallel planar alignment type PI

Electrode structure=ITO=200A, 1 cm×1 cm square pattern.

Methods

Switching Speed Measurement:

Switching times are recorded either using a microscope or with a HeNe laser operating at 632.8 nm, with the sample placed between crossed polarizers in both cases. Transmitted light is received by a photodiode, which is connected to an oscilloscope in the microscope case, or connected to a data acquisition board in the laser case. The switching times are acquired from the oscilloscope or from analyzing the data acquired from the data acquisition board.

Haze

The haze level is determined in accordance to the ASTM D1003 standard definition of haze.

Four different transmission measurements (T1 to T4) are performed, which are commonly known by the skilled person:

T1: Transmission without sample and white reflection standard

T2: Transmission with sample and white reflection standard

T3: Transmission without sample with light trap

T4: Transmission with sample and with light trap

As commonly known by the skilled person, the total transmittance (T2) is thereby defined as the sum of the parallel transmittance and the diffusion transmittance (T4).

The Haze is thereby defined as follows: Haze=[(T4/T2)−(T3/T1)]×100%

The haze data is taken from the active area of the cell only. The glue is masked off from the measurement system to avoid inconsistencies

WORKING EXAMPLES

Experiment 1

Cholesteric LC mixtures are prepared as given in the following table. The corresponding mixtures are capillary filled in test cells 1 using capillary action at room temp, annealed for 1 h at 100° C. and then irradiated at the same temperature with linearly polarised UV light (35 mW/cm$^2$) for the given time. The cells are then cooled to room temperature.

$V_{op}$, $t_{on}$ and $t_{off}$ were measured using Speedy electrooptic microscope set up.

% Haze was measured in transmission mode in Shimadzu 3600 UV-Vis with a single wavelength of 550 nm. $V_{op}$ was determined to be when the maximum % haze was achieved. $T_{on}$ and $T_{off}$ were taken to be the time when switching between 10% and 90% switched. The results are summarized in the following table:

| Exp. | LC Host | R-5011 [%- W/w] | RM-1 [%- w/w] | $V_{op}$ [V] | $t_{on}$ [ms] | $t_{off}$ [ms] | Haze [%] |
|---|---|---|---|---|---|---|---|
| 1.1* | N-1 | 0 | 6 | 16 | 0.62 | 1.16 | 29.77 |
| 1.2* | | 0.5 | 0 | 9 | 6.74 | 51100 | 42.00 |
| 1.3 | | 0.5 | 6 | 16 | 1.02 | 0.83 | 54.76 |
| 1.4 | | 0.6 | 6 | 16 | 1.18 | 0.8 | 63.28 |
| 1.5 | | 0.7 | 6 | 16 | 1.23 | 0.72 | 55.09 |
| 1.6 | | 0.8 | 6 | 16 | 1.44 | 0.71 | 58.8 |
| 1.7 | | 0.9 | 6 | 16 | 1.68 | 0.69 | 57.79 |
| 1.8 | | 1 | 6 | 23 | 0.81 | 0.58 | 32.05 |

As seen above, with a chiral system a good level of haze can be achieved compared to without a chiral system (c.f Exp. 1.1). Crucially in the polymer network chiral systems, the $t_{off}$ times are dramatically smaller than systems without a polymer network (c.f Exp. 1.2) showing good relaxation to the well-ordered state.

Experiment 2

The cholesteric LC mixtures are prepared as given in the following table. The corresponding mixtures are capillary filled in test cells 2 using capillary action at room temp, annealed for 1 h at 100° C. and then irradiated at the same temperature with linearly polarised UV light (35 mW/cm$^2$) for the given time. The cells are then cooled to room temperature.

$V_{op}$, $t_{on}$ and $t_{off}$ were measured using Speedy electrooptic microscope set up.

% Haze was measured in transmission mode in Shimadzu 3600 UV-Vis with a single wavelength of 550 nm. $V_{op}$ was determined to be when the maximum % haze was achieved. $T_{on}$ and $T_{off}$ were taken to be the time when switching between 10% and 90% switched. The results are summarized in the following table:

| Exp. | LC Host | R-5011 [%- W/w] | RM-1 [%- w/w] | $V_{op}$ [V] | $t_{on}$ [ms] | $t_{off}$ [ms] | Haze [%] |
|---|---|---|---|---|---|---|---|
| 2.1* | N-1 | 0 | 0 | 8 | 2.9 | 5.6 | 19.39 |
| 2.2 | | 0.5 | 6 | 12 | 2.4 | 1.2 | 51.75 |
| 2.3 | | 0.6 | 6 | 12 | 1.95 | 0.75 | 52.05 |
| 2.4 | | 0.7 | 6 | 12 | 1.99 | 0.95 | 51.48 |
| 2.5 | | 0.8 | 6 | 12 | 2.05 | 1.15 | 59.31 |
| 2.6 | | 0.9 | 6 | 12 | 2.38 | 1.07 | 54.01 |
| 2.7 | | 1 | 6 | 12 | 2.7 | 0.72 | 49.03 |

As seen above, a reduced cell thickness has the effect of reducing $V_{op}$ compared to a thicker cell as given in experiment 1. This also slightly reduces the maximum % haze achieved.

The invention claimed is:

1. A Cholesteric LC Medium for a PNLC light modulation element comprising

A) one or more polymerisable compounds in an amount of 2% to 10% by weight, wherein at least one of said one or more polymerisable compounds is a compound of formula I, $$P^{11}\text{-}Sp^{11}\text{-}Ar\text{-}Sp^{12}\text{-}P^{12}$$

wherein

Ar is one of the following groups

Ar1

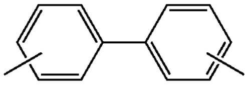

Ar2

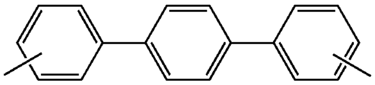

Ar3

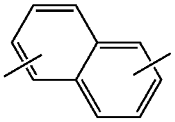

Ar4

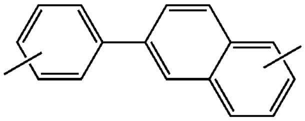

-continued

Ar5

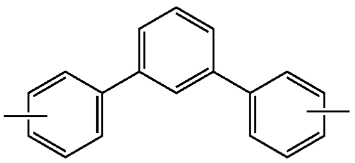

Ar6

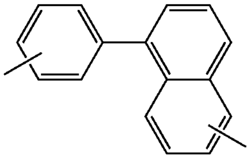

-continued

Ar7

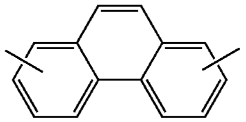

which is optionally substituted by one or more groups L,

L is on each occurrence identically or differently F, Cl, CN, P-Sp-, or a straight chain alkyl having 1 to 25 C atoms or a branched or cyclic alkyl having 3 to 25 C atoms, wherein one or more non-adjacent $CH_2$-groups are optionally replaced by —O—, —S—, —CO—, —CO—O—, —O—CO—, or —O—CO—O— in such a manner that O- and/or S-atoms are not directly connected with each other, and wherein one or more H atoms are each optionally replaced by F or Cl, $P^{11}$ and $P^{12}$ denote each and independently from another a polymerisable group, $Sp^{11}$ and $Sp^{12}$ denote each and independently from another a spacer group that is optionally substituted by one or more groups $P^{11}$ or $P^{12}$, or a single bond, and B) one or more non-polymerisable mesogenic or liquid-crystalline compounds, and C) one or more non-polymerisable chiral compounds in an amount of 0.1% to 0.9% by weight.

2. The Cholesteric LC medium according to claim 1, wherein one or more non-polymerisable chiral compounds having each alone or in combination with each other an absolute value of the helical twisting power ($|HTP_{total}|$) of 5 $\mu m^{-1}$ or more.

3. The Cholesteric LC medium according to claim 1, comprising one or more non-polymerisable chiral compounds in an amount of 0.5% to 0.9% by weight.

4. The Cholesteric LC medium according to claim 1, wherein the one or more non-polymerisable mesogenic or liquid-crystalline compounds are selected from compounds of formula A and/or B,

A

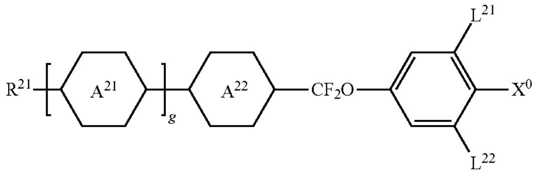

B

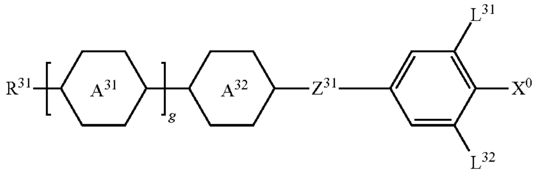

in which the individual radicals have, independently of each other and on each occurrence identically or differently, the following meanings:

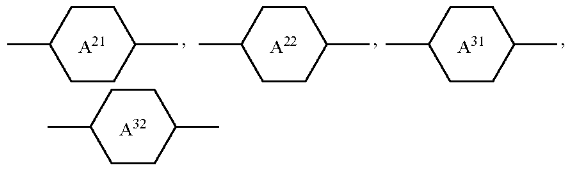

each, independently of one another, and on each occurrence, identically or differently, are one of the following groups

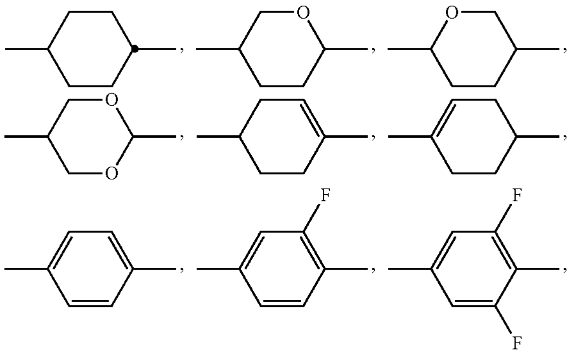

$R^{21}$, $R^{31}$ each, independently of one another, are alkyl, alkoxy, oxaalkyl or alkoxyalkyl having 1 to 9 C atoms or alkenyl or alkenyloxy having 2 to 9 C atoms, all of which are optionally fluorinated, $X^0$ is F, Cl, halogenated alkyl or alkoxy having 1 to 6 C atoms or halogenated alkenyl or alkenyloxy having 2 to 6 C atoms, $Z^{31}$ is —$CH_2CH_2$—, —$CF_2CF_2$—, —COO—, trans-CH═CH—, trans-CF═CF—, —$CH_2O$— or a single bond, $L^{21}$, $L^{22}$, $L^{31}$ and $L^{32}$ each, independently of one another, are H or F, and g is 0, 1, 2 or 3.

5. A process for the production of a cholesteric LC medium according to claim 1, comprising at least the step of mixing the one or more non-polymerisable mesogenic or liquid-crystalline compounds compounds and the one or more non-polymerisable chiral compounds with 2% to 10% of the polymerisable LC compounds.

6. A PNLC light modulation element comprising the cholesteric LC medium according to claim 1.

7. A PNLC light modulation element comprising a pair of opposing substrates, an in-plane electrode structure and a cholesteric LC medium located in the interspace of said substrates, wherein the light modulation element comprises a polymer network obtainable from the cholesteric LC medium according to claim 1 by exposing said Cholesteric LC Medium to actinic radiation that induces photopolymerisation of the polymerisable compounds in the cholesteric LC medium.

8. The PNLC light modulation element according to claim 7, comprising an electrode structure, corresponding to an IPS or FFS electrode structure.

9. The PNLC light modulation element according to claim 7, wherein the interspace between the two opposing substrates is in the range of 1 to 20 μm.

10. A process for the production of a PNLC light modulation element according to claim 7, comprising at least the steps of cutting and cleaning of the substrates, providing an in plane electrode structure on one of the substrates, optionally providing an alignment layer on the electrode structure, assembling the cell, filling the cell with the cholesteric LC medium, and exposing said cholesteric LC medium to actinic radiation that induces photopolymerisation of the polymerisable compounds in the cholesteric LC medium.

11. The process according to claim 10, wherein the photopolymerisation step is performed with light having a wavelength in the range of 250 to 450 nm.

12. The process according to claim 10, wherein the photopolymerisation step is performed with an irradiation intensity in the range of 5 to 150 $mW/cm^2$.

13. An optical or electro-optical device comprising the PNLC light modulation element according to claim 7.

14. The Cholesteric LC medium according to claim 1, wherein one or more non-polymerisable chiral compounds include the following compound

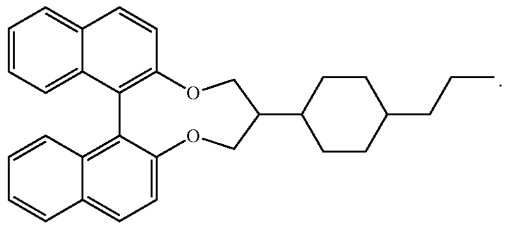 [SMILES: CCCC1CCC(C2COc3ccc4ccccc4c3-c3c(ccc4ccccc34)OC2)CC1]

15. The Cholesteric LC medium according to claim 14, comprising one or more non-polymerisable chiral compounds in an amount of 0.5% to 0.9% by weight.

16. The Cholesteric LC medium according to claim 1, comprising one or more non-polymerisable chiral compounds in an amount of 0.1% to 0.5% by weight.

17. The Cholesteric LC medium according to claim 1, comprising one or more non-polymerisable chiral compounds in an amount of 0.5% to 0.6% by weight.

18. The Cholesteric LC medium according to claim 1, comprising one or more non-polymerisable chiral compounds in an amount of 0.6% to 0.9% by weight.

19. The Cholesteric LC medium according to claim 1, wherein one or more non-polymerisable chiral compounds include one or more of the following compounds of:

formula Ch I,

Ch I

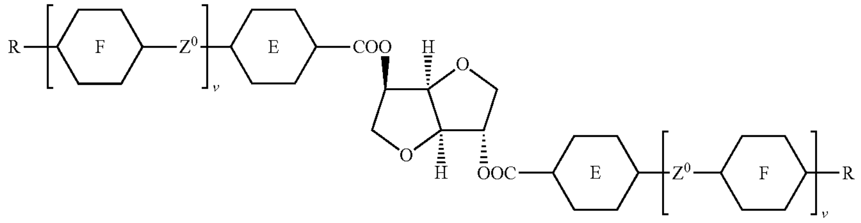

formula Ch II,

Ch II

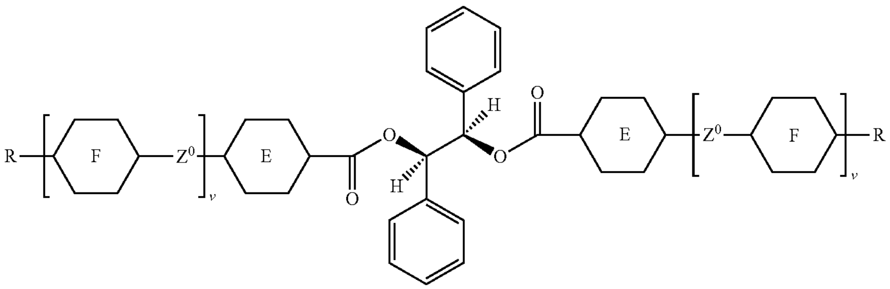

including the respective (S,S) enantiomer, wherein

E and F are each independently 1,4-phenylene or trans-1,4-cyclohexylene, v is 0 or 1, $Z^0$ is —COO—, —OCO—, —$CH_2CH_2$— or a single bond, and R is alkyl, alkoxy or alkanoyl with 1 to 12 C atoms.

20. The Cholesteric LC medium according to claim 1, wherein one or more non-polymerisable chiral compounds include one or more of the following compounds of: R/S-5011, CD-1, R/S-811 and/or CB-15, wherein R-5011 and S-5011 are enantiomers of (13bR)-5,6-dihydro-5-(trans-4-propylcyclohexyl)-4H-dinaphtho[2,1-f:1',2'-h][1,5]dioxonine, CD1 is R-(−)-2,2'-bis(diphenoxyphosphinyl)-1,1'-binaphthyl, S-811 is S-(+)-2-Octyl 4-(4-hexyloxybenzoyloxy)benzoate, R-811 is (R)-2-Octyl 4-((4-(hexyloxy)benzoyl)oxy)benzoate, and CB-15 is 4'-[(S)-2-methylbutyl]-[1,1'-biphenyl]-4-carbonitrile.

* * * * *